US010915550B2

(12) United States Patent
Zhu et al.

(10) Patent No.: US 10,915,550 B2
(45) Date of Patent: Feb. 9, 2021

(54) DATA PROCESSING METHOD, APPARATUS, SYSTEM, AND STORAGE MEDIUM

(71) Applicant: Tencent Technology (Shenzhen) Company Limited, Shenzhen (CN)

(72) Inventors: Chong Zhu, Shenzhen (CN); Hailin Lei, Shenzhen (CN); Yongsong Liu, Shenzhen (CN); Wei Zhao, Shenzhen (CN); Bin Hu, Shenzhen (CN); Honghui Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 416 days.

(21) Appl. No.: 15/955,483

(22) Filed: Apr. 17, 2018

(65) Prior Publication Data

US 2018/0232430 A1 Aug. 16, 2018

Related U.S. Application Data

(63) Continuation of application No. PCT/CN2017/089308, filed on Jun. 21, 2017.

(30) Foreign Application Priority Data

Jul. 13, 2016 (CN) .......................... 2016 1 0552873

(51) Int. Cl.
*G06F 16/27* (2019.01)
*G06F 16/22* (2019.01)
(Continued)

(52) U.S. Cl.
CPC ............ *G06F 16/27* (2019.01); *G06F 16/211* (2019.01); *G06F 16/2255* (2019.01);
(Continued)

(58) Field of Classification Search
CPC .... G06F 16/27; G06F 16/2471; G06F 16/284; G06F 16/2255; G06F 16/211
See application file for complete search history.

(56) References Cited

U.S. PATENT DOCUMENTS

| 6,453,314 B1 * | 9/2002 | Chan .................. G06F 16/2365 707/E17.005 |
| 2013/0006920 A1 * | 1/2013 | Kreindler ................. H04N 5/76 707/609 |

(Continued)

FOREIGN PATENT DOCUMENTS

| CN | 101916261 A | 12/2010 |
| CN | 102831120 A | 12/2012 |

(Continued)

OTHER PUBLICATIONS

Office Action in Chinese Application No. 201610552873.2, dated Jan. 2, 2019, pp. 1-9.

(Continued)

*Primary Examiner* — Kannan Shanmugasundaram
(74) *Attorney, Agent, or Firm* — Brinks Gilson & Lione

(57) ABSTRACT

Embodiments of the present disclosure disclose a data processing method, apparatus, and system. The method provided in the embodiments of the present disclosure includes receiving a data processing request sent by a client and obtaining a routing table according to the data processing request. The routing table stores structure information of a relational database. The relational database includes a plurality of sub-databases. The sub-database includes a plurality of partitioned tables, and the partitioned table includes a plurality of shards. The method also includes determining a target sub-database according to the data processing request and the routing table. The method further includes sending the data processing request to the target (Continued)

sub-database, so that the target sub-database performs an operation according to the data processing request.

18 Claims, 12 Drawing Sheets

(51) Int. Cl.
    *G06F 16/21*     (2019.01)
    *G06F 16/28*     (2019.01)
    *G06F 16/2458*     (2019.01)
    *H04L 12/741*     (2013.01)
    *H04L 29/08*     (2006.01)

(52) U.S. Cl.
    CPC ........ *G06F 16/2471* (2019.01); *G06F 16/278* (2019.01); *G06F 16/284* (2019.01); *H04L 45/54* (2013.01); *H04L 67/2814* (2013.01); *H04L 67/2833* (2013.01); *H04L 67/327* (2013.01); *H04L 45/74* (2013.01); *H04L 67/1097* (2013.01)

(56) References Cited

U.S. PATENT DOCUMENTS

| | | | | |
|---|---|---|---|---|
| 2014/0095502 A1* | 4/2014 | Ziauddin | ................ | G06F 16/21 707/737 |
| 2014/0122484 A1* | 5/2014 | Jagtiani | ............... | G06F 16/2282 707/737 |

FOREIGN PATENT DOCUMENTS

| | | |
|---|---|---|
| CN | 103714097 A | 4/2014 |
| CN | 104871153 A | 8/2015 |
| CN | 105512200 A | 4/2016 |
| CN | 106202441 A | 12/2016 |

OTHER PUBLICATIONS

International Search Report and Written Opinion for PCT Application No. PCT/CN2017/089308, dated Aug. 30, 2017, pp. 1-13.

* cited by examiner

DATA PROCESSING METHOD, APPARATUS, SYSTEM, AND STORAGE MEDIUM

RELATED APPLICATION

This application is a continuation application of PCT Patent Application No. PCT/CN2017/089308, filed on Jun. 21, 2017, which claims priority to Chinese Patent Application No. 201610552873.2, entitled "DATA PROCESSING METHOD, APPARATUS, AND SYSTEM" filed with the Chinese Patent Office on Jul. 13, 2016, both of which are incorporated herein by reference in their entireties.

FIELD OF THE TECHNOLOGY

This application relates to the field of communications technologies, and specifically, to a data processing method, apparatus, system, and a computer-readable storage medium.

BACKGROUND OF THE DISCLOSURE

With the prosperous development of the Internet, numbers of internet users and their Internet visits also rapidly increase. A conventional MySQL database (a relational database) cannot fulfill the requirements. A problem exists for the conventional MySQL database to handle the rapidly increasing demand of the developing internet. In view of this, a MySQL distributed database is proposed in a common technology. This present disclosure will solve the problem and improve the internet technology by improving the storage capability and the performance of the database to some extent.

SUMMARY

Embodiments of the present disclosure provide a data processing method, apparatus, and system, so as to solve the existing problem and improve internet technology.

An embodiment of the present disclosure provides a data processing method. The method includes receiving, by a device comprising a memory and a processor in communication with the memory, a data processing request sent by a client. The method includes obtaining, by the device, a routing table according to the data processing request. The routing table includes structure information of a relational database, the relational database includes a plurality of sub-databases, a sub-database of the plurality of sub-databases includes a plurality of partitioned tables, and a partitioned table of the plurality of partitioned tables includes a plurality of shards. The method also includes determining, by the device, a target sub-database of the plurality of sub-databases according to the data processing request and the routing table. The method further includes sending, by the device, the data processing request to the target sub-database, so that the target sub-database performs an operation according to the data processing request.

Correspondingly, an embodiment of the present disclosure further provides a data processing apparatus. The apparatus includes a memory storing instructions and a processor in communication with the memory. When the processor executes the instructions, the processor is configured to cause the apparatus to receive a data processing request sent by a client and obtain a routing table according to the data processing request. The routing table includes structure information of a relational database, the relational database includes a plurality of sub-databases, a sub-database of the plurality of sub-databases includes a plurality of partitioned tables, and a partitioned table of the plurality of partitioned tables includes a plurality of shards. When the processor executes the instructions, the processor is configured to cause the apparatus to determine a target sub-database of the plurality of sub-databases according to the data processing request and the routing table. When the processor executes the instructions, the processor is configured to further cause the apparatus to send the data processing request to the target sub-database, so that the target sub-database performs an operation according to the data processing request.

An embodiment of the present disclosure further provides a data processing system, including any data processing apparatus based on the relational database provided in the embodiments of the present disclosure, a client sending a data processing request, and the relational database, the relational database including a plurality of sub-databases, the sub-database including a plurality of partitioned tables, and the partitioned table including a plurality of shards.

An embodiment of the present disclosure further provides a non-transitory computer readable storage medium storing instructions, the instructions, when executed by a processor, cause the processor to perform receiving a data processing request sent by a client and obtaining a routing table according to the data processing request. The routing table includes structure information of a relational database, the relational database includes a plurality of sub-databases, a sub-database of the plurality of sub-databases includes a plurality of partitioned tables, and a partitioned table of the plurality of partitioned tables includes a plurality of shards. The instructions, when executed by a processor, cause the processor to perform determining a target sub-database of the plurality of sub-databases according to the data processing request and the routing table. The instructions, when executed by a processor, further cause the processor to perform sending the data processing request to the target sub-database, so that the target sub-database performs an operation according to the data processing request.

BRIEF DESCRIPTION OF THE DRAWINGS

To describe the technical solutions of the embodiments of the present disclosure more clearly, the following briefly introduces the accompanying drawings for describing the embodiments. The accompanying drawings are merely examples, and a person of ordinary skill in the art may derive other drawings from these accompanying drawings without creative efforts.

DESCRIPTION OF EMBODIMENTS

The following disclosure describes the technical solutions in the embodiments of the present disclosure with reference to the accompanying drawings in the embodiments of the present disclosure. The embodiments described below are merely examples. All other embodiments obtained by a person skilled in the art based on the embodiments of the present disclosure without creative efforts shall fall within the protection scope of the present disclosure.

The embodiments of the present disclosure provide a data processing method, apparatus, and system, which can be applied to data processing based on a relational database. A problem exists for the conventional MySQL database to handle the rapidly increasing demand of the developing internet. In view of this, a distributed MySQL database is described in the present disclosure. In the present disclosure, a large table is divided into a plurality of partitioned tables, and the plurality of partitioned tables are respectively stored in sub-databases. Then, a service client determines a to-be-used partitioned table by using a particular key in combination with a corresponding routing rule, so that the storage pressure and the performance is dispersed to each sub-database. Thus, the present disclosure solves the existing problem and improves the internet technology by improving the storage capability and the performance of the database to some extent.

The data processing system may include any data processing apparatus provided in the embodiments of the present disclosure. The data processing apparatus may be specifically integrated in a network device, for example, a device such as a gateway or a proxy server. In addition, the data processing system may further include other devices, such as a client device and a relational database. When a relational database is being established, data may be divided into a plurality of shards, and is stored in different partitioned tables. In addition, partitioned tables having foreign keys having association relationship with each other may be grouped into one group. For example, if a plurality of partitioned tables have a same shard key (shard key, used for identify a shard), the plurality of partitioned tables is grouped into one group. For convenience of description, in the embodiments of the present disclosure, each group is referred to as a sub-database, and one relational database may include a plurality of sub-databases, such as $DB_1$, $DB_2$, and $DB_3$. The data processing apparatus stores a corresponding routing table used for storing structure information of the relational database, so that when a data processing request is received, routing can be performed based on the routing table.

Figure 1A:
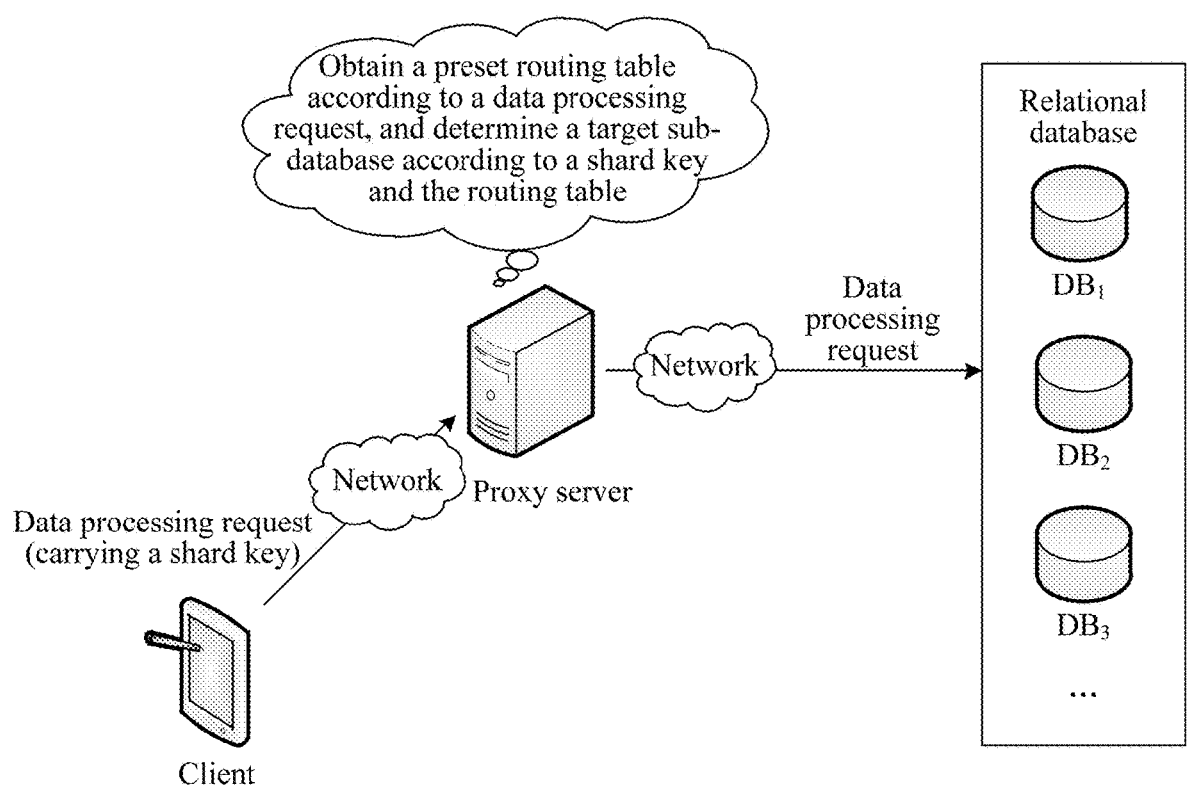
FIG. 1A is a schematic application scenario diagram of a data processing method according to an embodiment of the present disclosure.

For example, the data processing apparatus is specifically integrated into a proxy server. As shown in FIG. 1A, when receiving a data processing request carrying a shard key and sent by a client, for example, when receiving a structured query language (SQL) statement such as an insert statement, a query statement, a delete statement, a modify statement, or a join query statement for a relational database, the proxy server may obtain a routing table according to the data processing request, then determine a target sub-database according to the shard key and the routing table, and send the data processing request to the target sub-database, so that the target sub-database performs processing according to the data processing request. The routing table may be a preset routing table.

Some embodiments of the present disclosure are separately described below. It should be noted that numbers of the following embodiments are not intended to limit priority orders of the embodiments.

Embodiment 1

This embodiment of the present disclosure provides descriptions from the perspective of a data processing apparatus. The data processing apparatus may be specifically integrated in a network side device, for example, a device such as a gateway or a proxy server.

A data processing method based on a relational database includes receiving a data processing request sent by a client, the data processing request carrying a shard key. The data processing method includes obtaining a routing table according to the data processing request, the routing table storing structure information of a relational database, the relational database including a plurality of sub-databases, the sub-database including a plurality of partitioned tables, a foreign key association relationship existing between the plurality of partitioned tables, and the partitioned table including a plurality of shards. The data processing method includes determining a target sub-database according to the shard key and the routing table. The data processing method includes sending the data processing request to the target sub-database, so that the target sub-database performs processing according to the data processing request. The routing table may be a preset routing table.

Figure 1B:
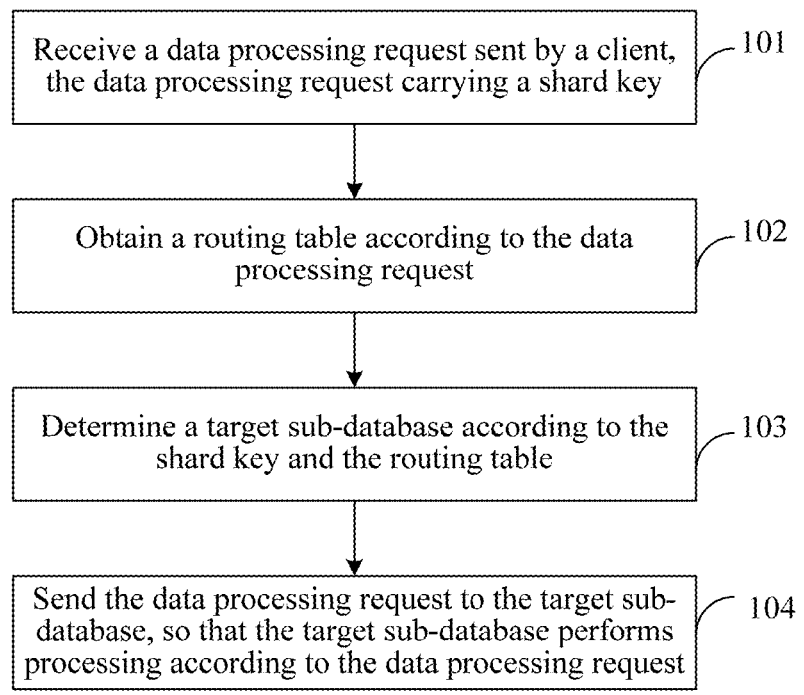
FIG. 1B is a flowchart of a data processing method according to an embodiment of the present disclosure.

As shown in FIG. 1B, a specific procedure of the data processing method may be as follows:

101: Receive a data processing request sent by a client. The data processing request may carry information such as a shard key.

It may be understood that the data processing request may alternatively carry no shard key. For example, the data processing request is a query request. When the query request carries no shard key, a query operation can also be performed, but the query request is sent to all sub-databases instead of one sub-database. Descriptions hereabout are also applicable to other embodiments.

The data processing request may include a plurality of SQL statements, which, for example, may be specifically at least one of: an insert statement, a query statement, a delete statement, a modify statement, or a join query statement for a relational database.

A type of the shard key carried in the data processing request may be specified according to an actual application requirement, and may be a character string or a specific value. When the routing table is to be searched, specifically, a hash operation can be performed on the shard key and then a modulo operation is performed. Then, the routing table is searched according to an obtained operation result, and details are not described herein.

102: Obtain a routing table according to the data processing request. The routing table may be a preset routing table.

The routing table stores structure information of a relational database. The structure information includes a data structure of the relational database and an association relationship between composition parts in the data structure, for example, an association relationship among a sub-database, a partitioned table, and each shard.

The relational database may be specifically a MySQL or another database having a similar data structure. The relational database may include a plurality of sub-databases, the sub-database may include a plurality of partitioned tables, a foreign key association relationship exists between the plurality of partitioned tables, and each partitioned table may include a plurality of shards.

That a foreign key association relationship exists between the partitioned tables means that partitioned tables having a foreign key association are distributed in one sub-database, so that no cross-database searching is required when join query is performed, thereby improving the join query efficiency. However, actually, arranging partitioned tables having a foreign key association relationship in one sub-database is not necessary. That is, even though no foreign key association relationship exists between a plurality of partitioned tables in a sub-database, the data processing apparatus responds to the received data processing request. For example, whether a foreign key association relationship exists between the partitioned tables in the sub-database has no effect on a query request, an insertion request, a deletion request, a modification request, or the like. However, for a join query request, when partitioned tables in a sub-database have no foreign key association relationship the join query efficiency may be reduced compared with a case in which partitioned tables in a sub-database have a foreign key association relationship. Descriptions hereabout are also applicable to other embodiments.

The relational database can be pre-established by maintenance personnel, or can be established by a system. That is, before the step of "receiving a data processing request sent by a client", the data processing method may further include the following steps:

(1) Receive a create table statement for the relational database sent by the client. The create table statement includes a name of a partitioned table needing to be created.

(2) Perform syntax analysis on the create table statement, to determine whether the create table statement includes a key name of a shard key. When the create table statement includes the key name of the shard key, perform step (3). When the create table statement does not include the key name of the shard key, perform step (4).

(3) When it is determined that the create table statement includes the key name of the shard key, establish an association relationship between the name of the partitioned table and the key name, record the association relationship into the routing table, and send the create table statement to the relational database, to perform a create table operation.

For convenience of subsequent establishment of the foreign key association relationship between the partitioned tables, create table statements including a same shard key can be grouped into one sub-database. That is, the step of "sending the create table statement to the relational database" may include determining whether another partitioned table in which the key name is used as a shard key exists in the routing table. When the another partitioned table exists, sending the create table statement to a sub-database to which the another partitioned table belongs, to perform the create table operation. When the another partitioned table does not exist, sending the create table statement to all sub-databases in the relational database, to perform the create table operation. It may be understood that the another partitioned table herein is a partitioned table different from the to-be-created partitioned table in the relational database and in which the key name is used as a shard key.

In this way, after table creation, subsequently, a foreign key association relationship between the partitioned tables can be further established according to the shard key. That is, after the create table operation is performed, the data processing method may further include setting a foreign key association relationship between a created partitioned table and the another partitioned table according to the key name.

For example, the data processing apparatus may directly set the foreign key association relationship between the created partitioned table and the another partitioned table according to the key name. Alternatively, the data processing apparatus may send a corresponding foreign key setting request to the relational database, and the relational database sets the foreign key association relationship between the created partitioned table and the another partitioned table according to the key name, and so on. Details are not described herein.

(4) When it is determined that the create table statement does not include the key name of the shard key, reject the create table statement.

In addition, optionally, the solution may further support a single back transaction. For example, when a transaction starts, each data processing request may be analyzed. If a relational database corresponding to one data processing request is different from that corresponding to a previous data processing request, the data processing request is rejected. That is, before the obtaining a routing table according to the data processing request (that is, step 102), the data processing method may further include determining whether the relational database corresponding to the data processing request is consistent with a relational database corresponding to a previous data processing request. When the two relational databases are consistent, the data processing method may further include performing the step of obtaining a routing table according to the data processing request. When the two relational databases are inconsistent, the data processing method may further include rejecting the data processing request.

Optionally, when the data processing request is rejected, an error may be further reported. For example, error prompt information is generated and sent to the client.

Optionally, before it is determined whether the relational database corresponding to the data processing request is consistent with a relational database corresponding to a previous data processing request, the method includes determining whether the data processing request is a transaction termination statement. When the data processing request is a transaction termination statement, the current transaction is terminated. When the data processing request is not a transaction termination statement, the step of determining whether the relational database corresponding to the data processing request is consistent with a relational database corresponding to a previous data processing request is performed.

103: Determine a target sub-database according to the shard key and the routing table.

According to different data processing requests, there are different manners of determining the target sub-database. For example, for insertion, query, deletion, modification, and join query (join), manners may be as follows:

(1) Insertion

If the data processing request is an insert statement for the relational database, the step of determining the target sub-database according to the shard key and the routing table includes performing syntax analysis on the insert statement, to determine whether a shard key recorded in the routing table exists in the insert statement. When the shard key exists, the step of determining the target sub-database according to the shard key and the routing table includes searching the routing table according to the shard key carried in the insert statement, to determine the target sub-database. When the shard key does not exist, the step of determining the target sub-database according to the shard key and the routing table includes rejecting the insert statement.

(2) Query

If the data processing request is a query statement for the relational database, the step of determining the target sub-database according to the shard key and the routing table includes performing syntax analysis on the query statement, to determine whether a shard key recorded in the routing table exists in the query statement. When the shard key exists, the step of determining the target sub-database according to the shard key and the routing table includes searching the routing table according to the shard key carried in the query statement, to determine the target sub-database. When the shard key does not exist, the step of determining the target sub-database according to the shard key and the routing table includes determining all the sub-databases in the relational database as target sub-databases. It can be learned that when the query statement carries no shard key, the target sub-database can also be determined, and in this case, the determined target sub-database is all the sub-databases.

Cases of deletion and modification are similar to that of query. For details, refer to the following (3) and (4).

(3) Deletion

If the data processing request is a delete statement for the relational database, the step of determining the target sub-database according to the shard key and the routing table includes performing syntax analysis on the delete statement, to determine whether a shard key recorded in the routing table exists in the delete statement. When the shard key exists, the step of determining the target sub-database according to the shard key and the routing table includes searching the routing table according to the shard key carried in the delete statement, to determine the target sub-database. When the shard key does not exist, the step of determining the target sub-database according to the shard key and the routing table includes determining all the sub-databases in the relational database as target sub-databases. It can be learned that when the delete statement carries no shard key, the target sub-database can also be determined, and the determined target sub-database is all the sub-databases.

(4) Modification

If the data processing request is a modify statement for the relational database, the step of determining the target sub-database according to the shard key and the routing table includes performing syntax analysis on the modify statement, to determine whether a shard key recorded in the routing table exists in the modify statement. When the shard key exists, the step of determining the target sub-database according to the shard key and the routing table includes searching the routing table according to the shard key carried in the modify statement, to determine the target sub-database. When the shard key does not exist, the step of determining the target sub-database according to the shard key and the routing table includes determining all the sub-databases in the relational database as target sub-databases. It can be learned that when the modify statement carries no shard key, the target sub-database can also be determined, and the determined target sub-database is all the sub-databases.

(5) Join Query

If the data processing request is a join query statement for the relational database, and the join query statement indicates a name of a partitioned table on which join query needs to be performed, the step of determining the target sub-database according to the shard key and the routing table includes performing syntax analysis on the join query statement, to determine whether the join query statement satisfies a first condition or a second condition. The first condition may be that the join query statement carries a shard key whose value is a constant, and the second condition may be that the join query statement carries shard keys of all partitioned tables on which join query needs to be performed. A comparison operator between the shard keys being an equal sign. When the first condition or the second condition is satisfied, the step of determining the target sub-database according to the shard key and the routing table includes searching the routing table according to a shard key carried in the join query statement, to determine the target sub-database. When neither the first condition nor the second condition is satisfied, the step of determining the target sub-database according to the shard key and the routing table includes rejecting the join query statement.

It can be learned from the foregoing analysis that for some data processing requests carrying a shard key, the target sub-database is determined according to the shard key, but for some data processing requests carrying no shard key, the target sub-database can also be determined. For example, when the foregoing query, deletion, or modification request does not carry a shard key, the determined target sub-database is all the sub-databases. Therefore, step 103 may also be described as "determining a target sub-database according to the data processing request and the routing table". Descriptions hereabout are also applicable to other embodiments.

104: Send the data processing request to the target sub-database, so that the target sub-database performs an operation according to the data processing request.

For example, if the data processing request is an insert statement, the target sub-database can perform an insertion operation according to the insert statement. Likewise, if the data processing request is a query statement, a delete statement, a modify statement, or a join query statement, the target sub-database can perform a query operation, a deletion operation, a modification operation, a join query operation, or the like according to such statements, and details are not described herein.

Optionally, when join query is performed, in addition to directly providing a join query result to the client, the data processing apparatus may also aggregate a join query result and then provide an aggregation result to the client. That is, after the step of "sending the data processing request to the target sub-database", the data processing method may further include receiving a join query result returned by the target sub-database; aggregating the join query result, to obtain an aggregation result; and sending the aggregation result to the client.

It can be learned from the foregoing that, in this embodiment, after the data processing request sent by the client is received, the routing table can be obtained according to the data processing request, the routing table storing the structure information of the relational database (the relational database including a plurality of sub-databases, the sub-database including a plurality of partitioned tables, the foreign key association relationship existing between the plurality of partitioned tables, and the partitioned table including a plurality of shards). Then, the target sub-database is determined according to the shard key carried in the data processing request and the routing table, and the data processing request is sent to the target sub-database, so that the target sub-database performs an operation according to the data processing request. Because in the solution, the client does not need to search for routing between the sub-database and the partitioned table, a user does not need to learn of logic between each sub-database and each partitioned table. That is, from the perspective of the user, there is just a relational database. Therefore, compared with a solution in a common technology in which a particular application program is required to manage a sub-database, a partitioned table, and a routing rule for the sub-database and the partitioned table, routing in the present disclosure only needs to be simply disposed at a proxy layer so that implementation is relatively simple. In addition, in the present disclosure, a foreign key association relationship exists between a plurality of partitioned tables of each sub-database. Therefore, operations such as cross-table join query (join) can be effectively supported, thereby greatly improving the performance of the database.

According to the method described in Embodiment 1, detailed descriptions are further provided below by using examples in Embodiment 2 to Embodiment 5.

Embodiment 2

In this embodiment, descriptions are provided by using an example in which the data processing apparatus is specifically integrated in a proxy server, the relational database is specifically MySQL, and the data processing request for the relational database is specifically an insert statement for the MySQL.

Figure 2A:
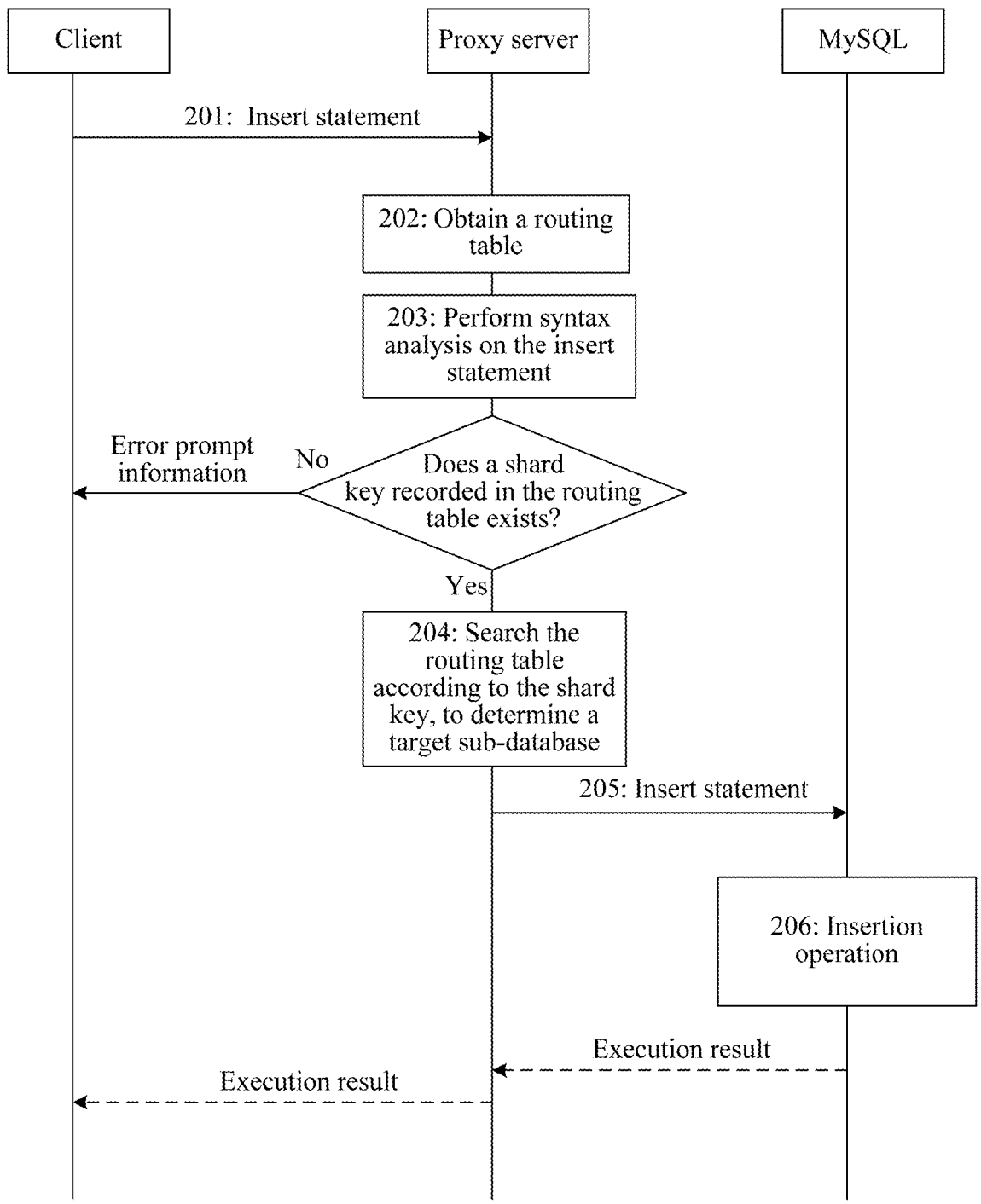
FIG. 2A is a flowchart of an insertion operation in a data processing method according to an embodiment of the present disclosure.

As shown in FIG. 2A, a specific procedure of a data processing method based on the relational database may be as follows:

201: A client sends the insert statement for the MySQL to the proxy server.

The insert statement may carry a shard key. For example, a shard with a specified key name of "a1" is used as a shard key. In this case, information such as "a1" may be included in the insert statement.

202: After receiving the insert statement, the proxy server obtains a routing table according to the insert statement.

The routing table stores structure information of the MySQL. The MySQL may include a plurality of sub-databases, each sub-database may include a plurality of partitioned tables, a foreign key association relationship exists between the plurality of partitioned tables, and each partitioned table may include a plurality of shards.

Figure 2B:
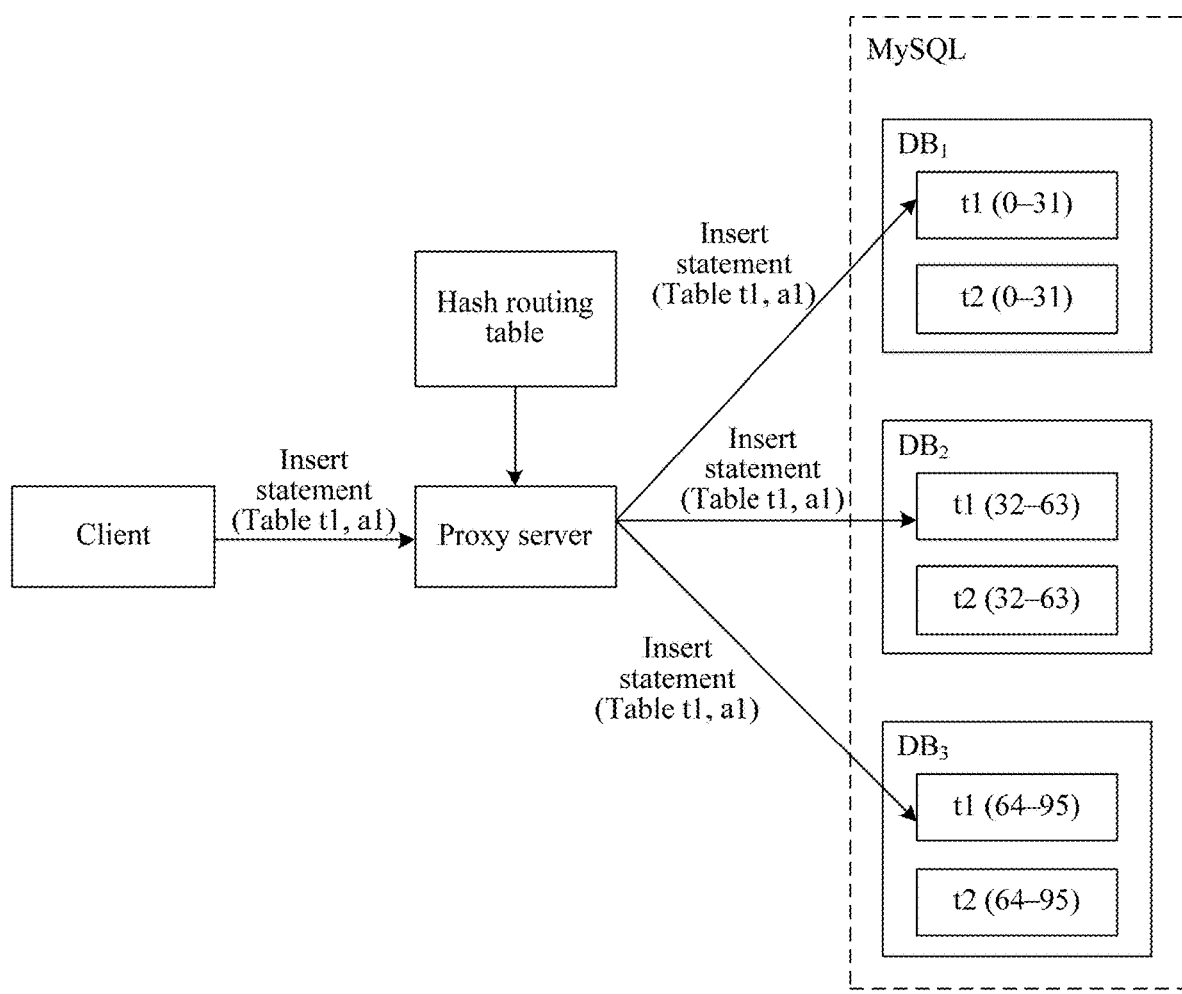
FIG. 2B is a schematic application scenario diagram of an insertion operation in a method according to an embodiment of the present disclosure.

For example, referring to FIG. 2B, the MySQL includes three sub-databases: $DB_1$, $DB_2$, and $DB_3$. Part of information in the routing table may be specifically as follows:

hash (shard key, 96)
(0-31) $DB_1$
(32-63) $DB_2$
(64-95) $DB_3$
Table t1:
shard key: a1
Table t2:
shard key: a2

Each sub-database may include a plurality of partitioned tables, and for example, may include a partitioned table t1 and a partitioned table t2. Each partitioned table may include 32 shards. For example, each partitioned table in the sub-database $DB_1$ may include shards for which hash values of shard keys are 0 to 31, each partitioned table in the sub-database $DB_2$ may include shards for which hash values of shard keys are 32 to 63, and each partitioned table in the sub-database $DB_3$ may include shards for which hash values of shard keys are 64 to 95. A corresponding key may be specified as the shard key according to an actual application requirement. For example, in the foregoing routing table, a shard key with a key name of "a1" is specified as a shard key in the partitioned table t1 (that is, shard key: a1), and a shard key with a key name of "a2" is specified as a shard key in the partitioned table t2 (that is, shard key: a2).

Figure 2C:
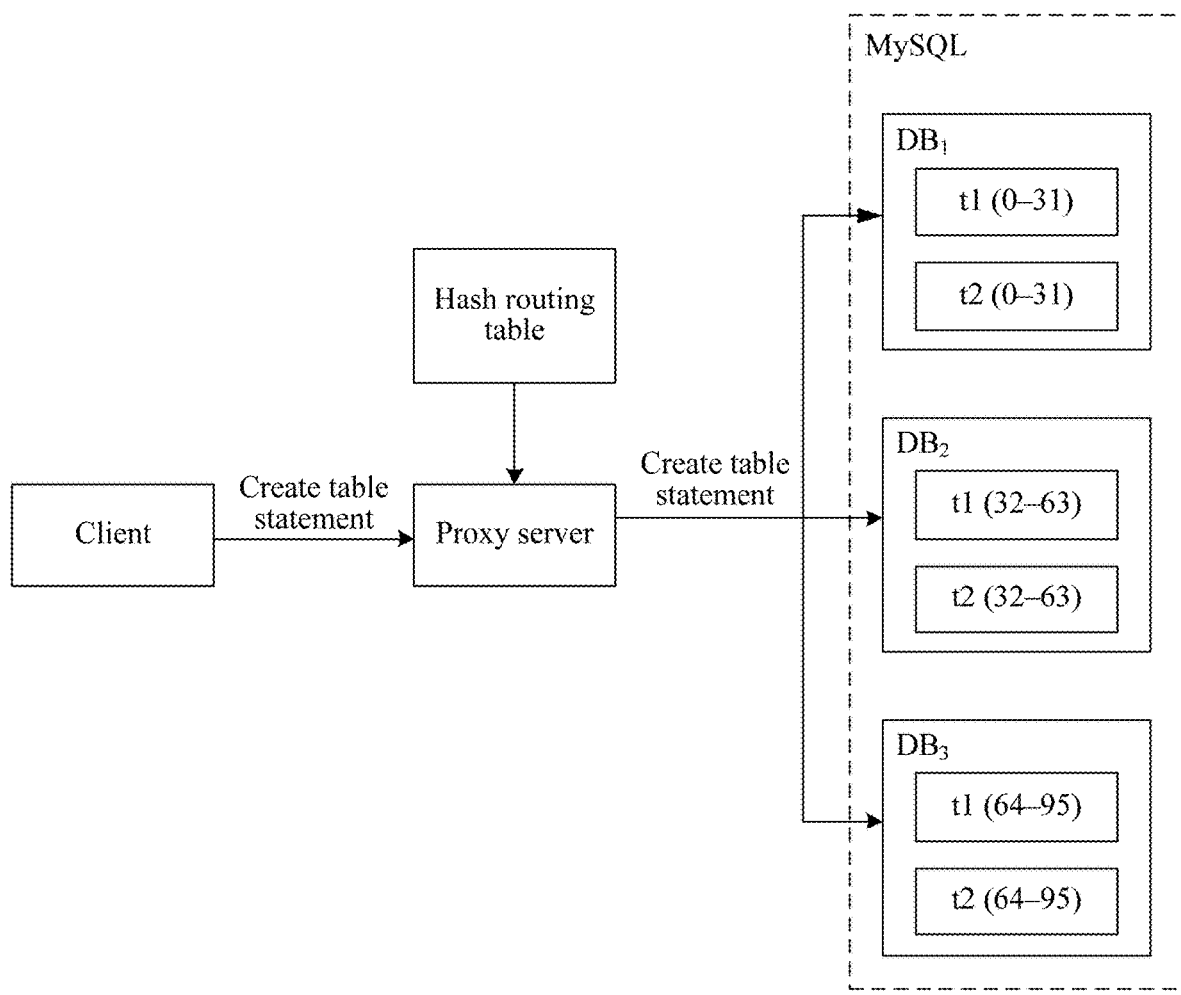
FIG. 2C is a schematic application scenario diagram of a create table operation in a method according to an embodiment of the present disclosure.

The MySQL can be pre-established by maintenance personnel, or can be established by a system. For example, the MySQL includes three sub-databases: $DB_1$, $DB_2$, and $DB_3$. Referring to FIG. 2C, a create table procedure for the MySQL may be specifically as follows:

S1: The client sends a create table statement for the MySQL to the proxy server, the create table statement includes a name of a partitioned table needing to be created.

For example, if the partitioned table t1 needs to be created, it may be indicated in the create table statement that a partitioned table needing to be created is "t1". Likewise, if the partitioned table t2 needs to be created, it may be indicated in the create table statement that a partitioned table needing to be created is "t2", and so on.

S2: The proxy server performs syntax analysis on the create table statement after receiving the create table statement, to determine whether the create table statement specifies a key name of a shard key. When the create table statement specifies the key name of the shard key, the proxy server performs step S3. When the create table statement specifies the key name of the shard key, the proxy server rejects the create table statement.

For example, the partitioned table t1 is to be created. If the create table statement is:

MySQL>create table t1(a int,b int,c char(20))

because the create table statement specifies no key name of a shard key, in this case, the create table statement can be rejected in this case.

Optionally, corresponding error prompt information may be generated as follows:

ERROR 1005(07000): proxy Warning-sql is not legal,tokenizer_gram went wrong.

For another example, still, the partitioned table t1 is to be created. If the create table statement is:

MySQL>create table t1(a int,b int,c char(20))shard key=a1 because the create table statement specifies that a key name of a shard key is "shard key=a1", in this case, step S3 can be performed. Optionally, corresponding prompt information may be further generated, to indicate that a table is allowed to be created. For example, the following statement may be generated:

Querv OK,0 rows affected(1.56 sec).

S3: When determining that the create table statement specifies a key name of a shard key, the proxy server establishes an association relationship between the name of the partitioned table and the key name, records the association relationship into the routing table, and sends the create table statement to the MySQL.

For convenience of subsequent establishment of the foreign key association relationship between the partitioned tables, create table statements having a same shard key can be grouped into one sub-database. That is, the step of sending the create table statement to the MySQL may include:

determining whether another partitioned table in which the key name is used as a shard key exists in the routing table; and if the another partitioned table exists, sending the create table statement to a sub-database to which the another partitioned table belongs, to perform the create table operation; when the another partitioned table does not exist, sending the create table statement to all sub-databases in the MySQL, to perform the create table operation.

S4: After receiving the create table statement, the MySQL performs a create table operation according to the create table statement.

For example, if all of the sub-databases $DB_1$, $DB_2$, and $DB_3$ receive the create table statement, and the create table statement instructs to create the partitioned table t1, the create table operation may be separately performed on the partitioned table t1 in the sub-databases (that is, $DB_1$, $DB_2$, and $DB_3$). If the create table statement instructs to create the partitioned table t2, the create table operation may be separately performed on the partitioned table t2 in the sub-databases, and so on.

S5: Optionally, after table creation, the MySQL can return a response indicating a table creation success to the proxy server.

S6: The proxy server sets a foreign key association relationship between a created partitioned table and the another partitioned table according to the key name.

For example, the proxy server may directly set the foreign key association relationship between the created partitioned table and the another partitioned table according to the key name. Alternatively, the proxy server may send a corresponding foreign key setting request to the MySQL, and the MySQL sets the foreign key association relationship between the created partitioned table and the another partitioned table according to the key name. For example, a foreign key association relationship between the partitioned table t1 and the partitioned table t2 may be created. Details are not described herein.

203: The proxy server performs syntax analysis on the insert statement, to determine whether a shard key recorded in the routing table exists in the insert statement; and when the shard key exists, performs step 204; and when the shard key does not exist, rejects the insert statement. For example, the proxy server may send error prompt information to the client.

For example, if the insert statement is:

MySQL>inser into $t1(b1,c1)$values(4,"record3")

because the shard key recorded in the routing table does not exist in the insert statement (the shard key specified in the partitioned table t1 is a1), in this case, the proxy server may reject the insert statement. Optionally, corresponding error prompt information may be generated as follows:

ERROR 1005(07000): proxy Warning-sql is no shard key.

For another example, if the insert statement is:

MySQL>inser into $t1(a1,c1)$values(4,"record3")

because the shard key "a1" recorded in the routing table exists in the insert statement (the shard key specified in the partitioned table t1 is a1), in this case, step 204 may be performed. Optionally, corresponding prompt information may be further generated to indicate that insertion is allowed. For example, the following statement may be generated:

Querv OK,1 rows affected(0.01 sec).

204: The proxy server searches the routing table according to the shard key carried in the insert statement, to determine a target sub-database.

For example, still, the insert statement is:

MySQL>inser into $t1(a1,c1)$values(4,"record3").

It can be learned from the routing table that the partitioned table t1 exists in all of the sub-databases $DB_1$, $DB_2$, and $DB_3$. Therefore, the target sub-database can be determined in $DB_1$, $DB_2$, and $DB_3$ according to a specific value of a1. For example, if a hash value of a1 is any value from 0 to 31, the target sub-database is $DB_1$; if a hash value of a1 is any value from 32 to 63, the target sub-database is $DB_2$; if a hash value of a1 is any value from 64 to 95, the target sub-database is $DB_3$.

205: The proxy server sends the insert statement to the target sub-database, and performs step 206.

For example, if the target sub-database is determined as $DB_1$, $DB_2$, or $DB_3$ in step 204, the proxy server may send the insert statement to $DB_1$, $DB_2$, or $DB_3$.

206: The target sub-database performs an insertion operation according to the insert statement.

Optionally, after the insertion operation is performed, the target sub-database may further return a corresponding execution result to the proxy server, and then the proxy server sends the result to the client, to notify the user.

It can be learned from the foregoing that in this embodiment, after the insert statement sent by the client is received, the routing table can be obtained by the proxy server according to the insert statement. Then, the target sub-database is determined according to the shard key carried in the insert statement and the routing table, and the insert statement is sent to the target sub-database, so that the target sub-database performs the insertion operation according to the insert statement. Because in this embodiment of the present disclosure, the client does not need to search for routing between the sub-database and the partitioned table, a user does not need to learn of logic between each sub-database and each partitioned table. That is, from the perspective of the user, there is just MySQL. Therefore, compared with a solution in a common technology in which a particular application program is required to manage a sub-database, a partitioned table, and a routing rule for the sub-database and the partitioned table, routing in the embodiment of the present disclosure only needs to be simply disposed at a proxy layer, and implementation is relatively simple. In addition, in the embodiment of the present disclosure, when the table is being created, because the partitioned tables having the same shard key are grouped into one sub-database, a foreign key association relationship exists between a plurality of partitioned tables of each sub-database. Therefore, operations such as cross-table join query can be effectively supported, thereby greatly improving the performance of the database.

Embodiment 3

What is the same as Embodiment 2 is that in this embodiment, descriptions are provided still by using an example in which the data processing apparatus is specifically integrated in a proxy server, and the relational database is specifically MySQL. What is different from Embodiment 2 is that in this embodiment, descriptions are provided by using an example in which the data processing request is specifically a query statement for the MySQL.

Figure 3A:
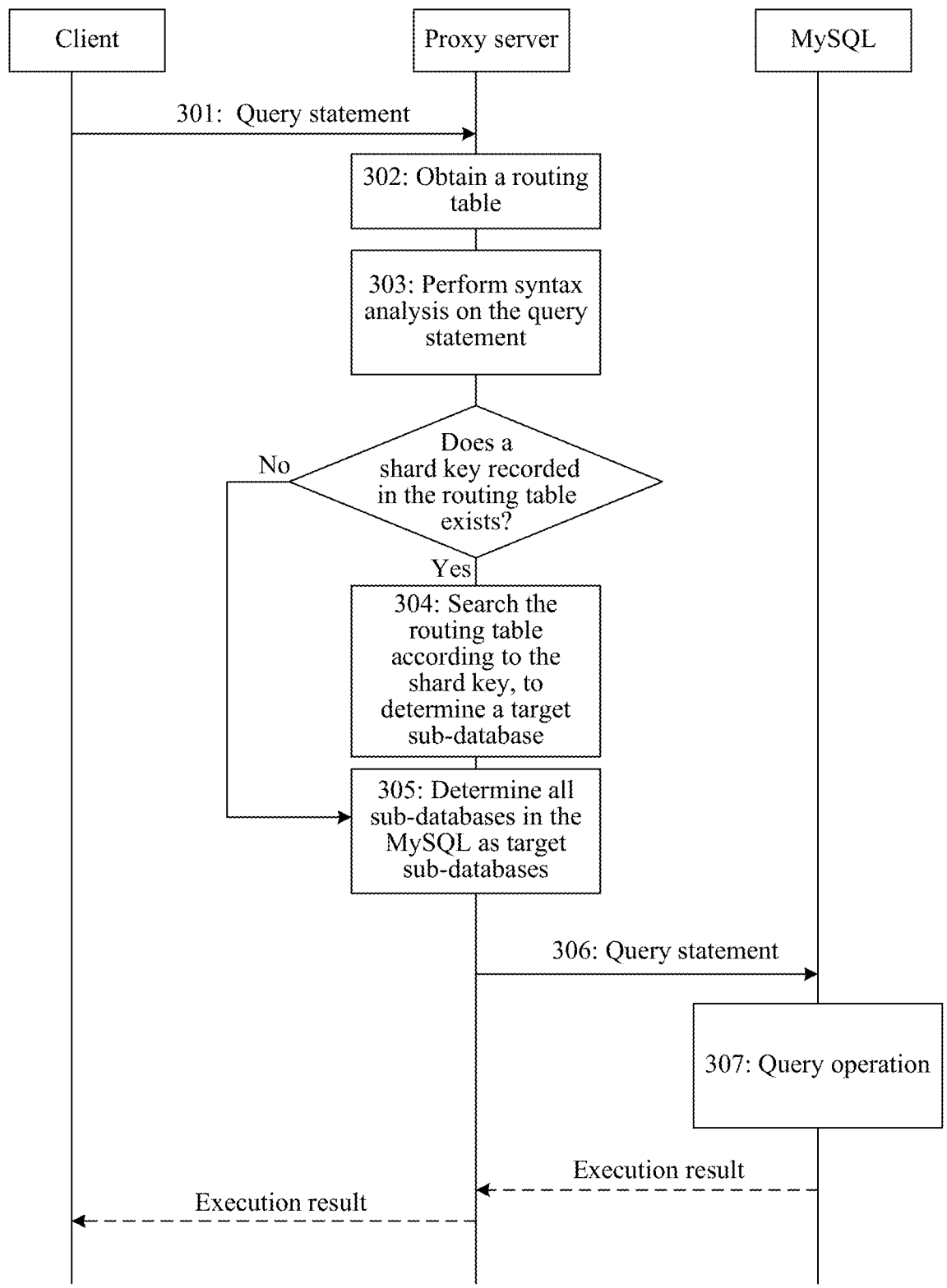
FIG. 3A is a flowchart of a query operation in a data processing method according to an embodiment of the present disclosure.

As shown in FIG. 3A, a specific procedure of a data processing method based on the relational database may be as follows:

301: A client sends the query statement for the MySQL to the proxy server.

The query statement may carry a shard key. For example, a shard with a specified key name of "a1" is used as a shard key. In this case, information such as "a1=xxx" may be added to the query statement. "xxx" may be a character string, a specific value such as 1, 2, 86, or the like. When the routing table is searched subsequently, a hash operation can be performed on "xxx" and then a modulo operation is performed. Then, the routing table is searched according to an obtained operation result, and details are not described herein.

302: After receiving the query statement, the proxy server obtains a routing table according to the query statement.

The routing table stores structure information of the MySQL. The MySQL may include a plurality of sub-databases, each sub-database may include a plurality of partitioned tables, a foreign key association relationship exists between the plurality of partitioned tables, and each partitioned table may include a plurality of shards.

Figure 3B:
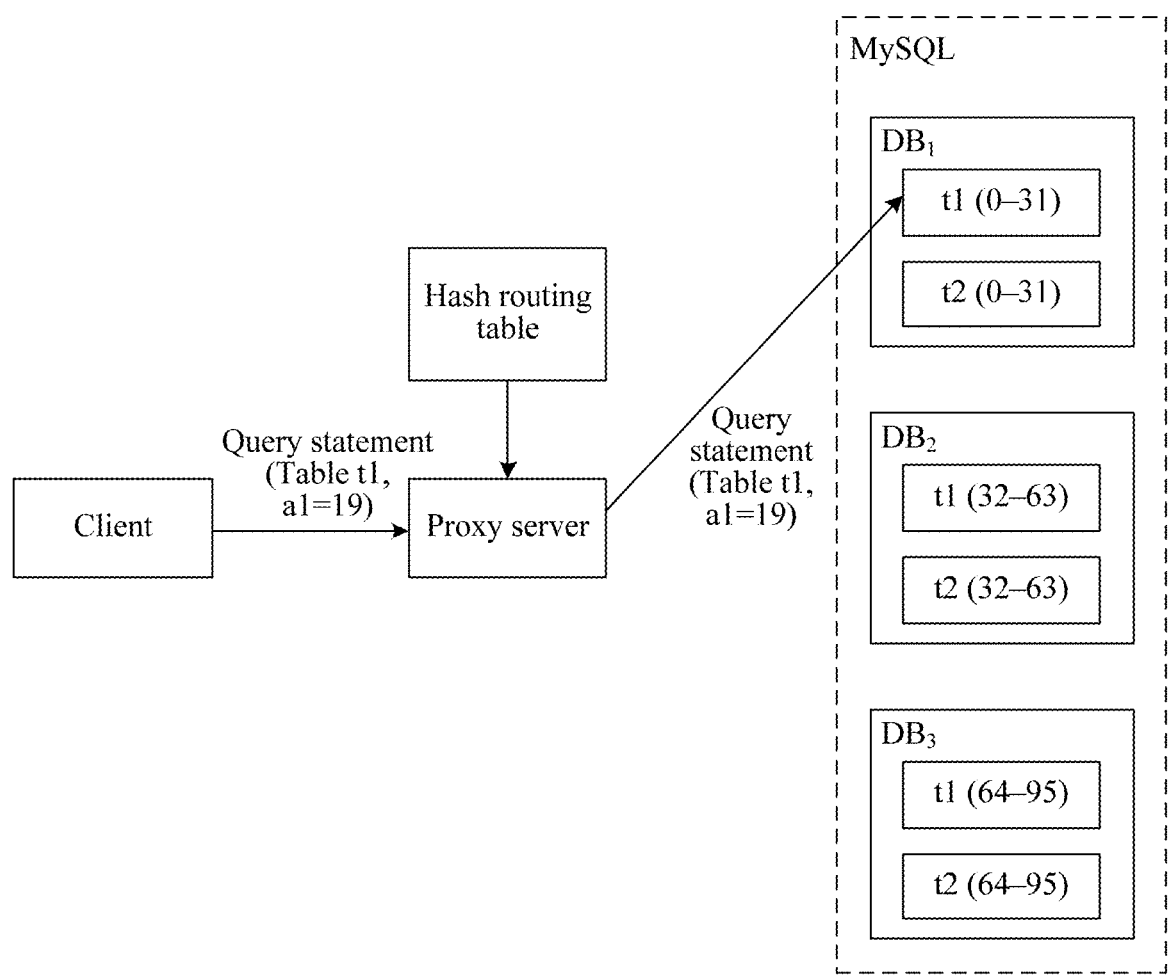
FIG. 3B is a schematic application scenario diagram of query (carrying a shard key) in a method according to an embodiment of the present disclosure.
Figure 3C:
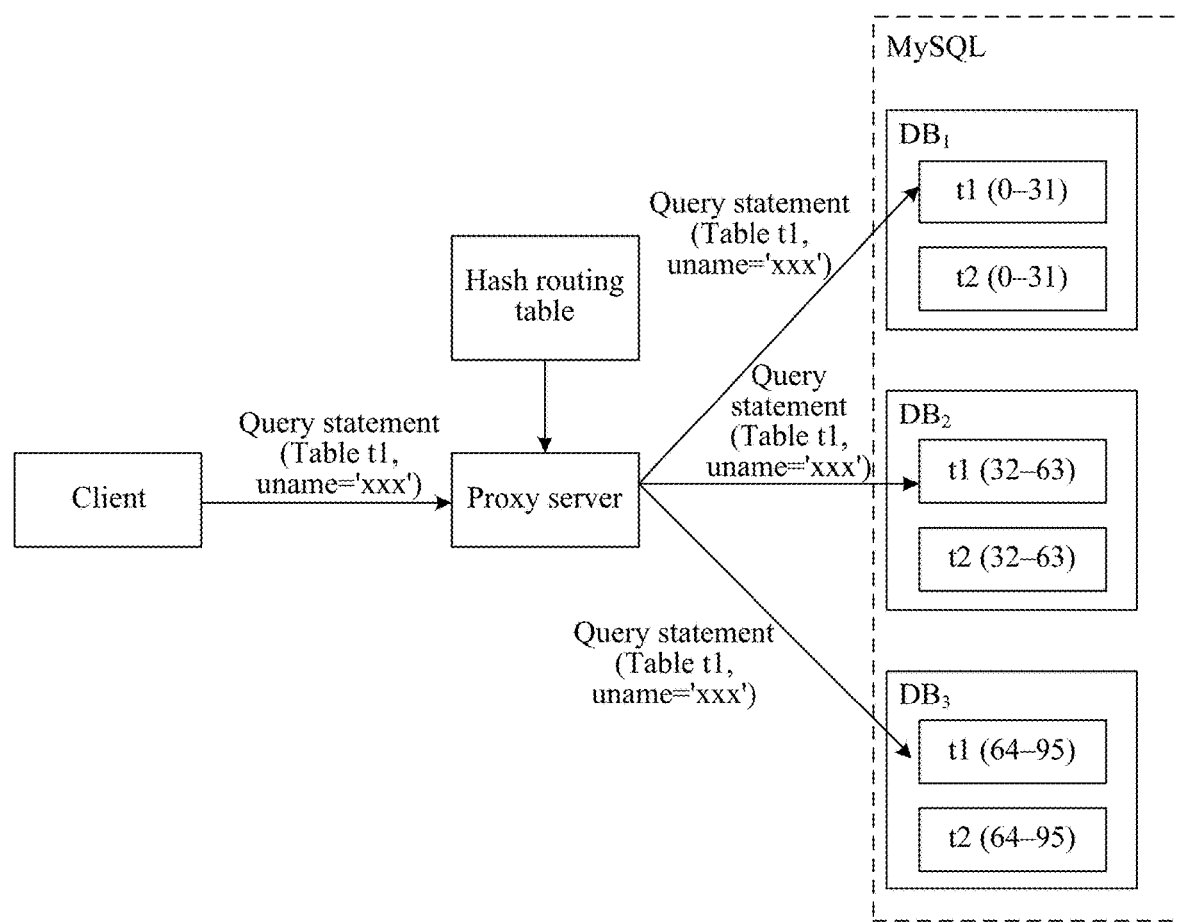
FIG. 3C is a schematic application scenario diagram of query (carrying no shard key) in a method according to an embodiment of the present disclosure.

For example, referring to FIG. 3B and FIG. 3C, the MySQL includes three sub-databases: $DB_1$, $DB_2$, and $DB_3$. Part of information in the routing table may be specifically as follows:

|  |
| --- |
| hash (shard key, 96) |
| (0-31) $DB_1$ |
| (32-63) $DB_2$ |
| (64-95) $DB_3$ |
| Table t1: |
| shard key: a1 |
| Table t2: |
| shard key: a2 |

Each sub-database may include a plurality of partitioned tables, and for example, may include a partitioned table t1 and a partitioned table t2. Each partitioned table may include 32 shards. For example, each partitioned table in the sub-database $DB_1$ may include shards for which hash values of shard keys are 0 to 31, each partitioned table in the sub-database $DB_2$ may include shards for which hash values of shard keys are 32 to 63, and each partitioned table in the sub-database $DB_3$ may include shards for which hash values of shard keys are 64 to 95. A corresponding key may be specified as the shard key according to an actual application requirement. For example, in the foregoing routing table, a shard key with a key name of "a1" is specified as a shard key in the partitioned table t1 (that is, shard key: a1), and a shard key with a key name of "a2" is specified as a shard key in the partitioned table t2 (that is, shard key: a2).

The MySQL can be pre-established by maintenance personnel, or can be established by a system. For details, refer to Embodiment 2, and details are not described herein again.

303: The proxy server performs syntax analysis on the query statement, to determine whether a shard key recorded in the routing table exists in the query statement; and when the shard key exists, performs step 304; and when the shard key does not exist, performs step 305.

For example, if the query statement is:

MySQL>select*from $t1$ where $a1=19$ because the shard key "a1" recorded in the routing table exists in a constraint condition of the query statement, step 304 can be performed.

For another example, if the query statement is:

MySQL>select*from $t1$ where $uname='xxx'$ because a constraint condition of the query statement only instructs to query for data with "uname" being "xxx", and the shard key "a1" recorded in the routing table does not exist in the query statement, step 305 can be performed.

304: The proxy server searches the routing table according to the shard key carried in the query statement, to determine a target sub-database, and then performs step 306.

For example, still, if the query statement is:

MySQL>select*from $t1$ where $a1=19$

The query statement instructs to query for a shard with a1=19, and it can be learned according to the routing table that "19" is located in the sub-database $DB_1$. Therefore, it can be determined that the sub-database $DB_1$ is the target sub-database. For details, refer to FIG. 3B.

305: If the query statement carries no shard key, the proxy server determines all sub-databases in the MySQL as target sub-databases, and then performs step 306.

For example, the MySQL includes the sub-databases $DB_1$, $DB_2$, and $DB_3$. In this case, the proxy server may determine $DB_1$, $DB_2$, and $DB_3$ as the target sub-databases. For details, refer to FIG. 3C.

306: The proxy server sends the query statement to the target sub-database, and performs step 307.

For example, the proxy server may specifically send the query statement to a corresponding partitioned table in the target sub-database. For example, if the query statement instructs to query the partitioned table t1, the query statement can be sent to the partitioned table t1 in the target sub-database.

For example, referring to FIG. 3B, the query statement instructs to query for a shard with "a1=19" in the partitioned table t1. Therefore, in this case, the proxy server can send the query statement to the partitioned table t1 in $DB_1$.

For another example, referring to FIG. 3C, the query statement instructs to query for a shard key with a name of "xxx" in the partitioned table t1. Therefore, in this case, the proxy server can send the query statement to the partitioned table t1 in $DB_1$, $DB_2$, and $DB_3$.

307: The target sub-database performs a query operation according to the query statement.

For example, if the target sub-database is $DB_1$, the shard with "a1=19" can be queried for in $DB_1$ according to the query statement.

For another example, if the target sub-databases are $DB_1$, $DB_2$, and $DB_3$, data with "uname" being "xxx" can be queried for in t1 in $DB_1$, $DB_2$, and $DB_3$ according to the query statement.

Optionally, after the query operation is performed, the target sub-database may further return a corresponding execution result to the proxy server, and then the proxy server sends the result to the client, to notify the user.

It can be learned from the foregoing that in this embodiment, after the query statement sent by the client is received, the routing table can be obtained according to the query statement. Then, the target sub-database is determined according to the shard key carried in the query statement and the routing table, and the query statement is sent to the target sub-database, so that the target sub-database performs the query operation according to the query statement. Because in this embodiment of the present disclosure, the client does not need to search for routing between the sub-database and the partitioned table, a user does not need to learn of logic between each sub-database and each partitioned table. That is, from the perspective of the user, there is just MySQL. Therefore, compared with a solution in a common technology in which a particular application program is required to manage a sub-database, a partitioned table, and a routing rule for the sub-database and the partitioned table, routing in this embodiment of the present disclosure only needs to be simply disposed at a proxy layer, and implementation is relatively simple. In addition, in this embodiment of the present disclosure, when the table is being created, because the partitioned tables having the same shard key are grouped into one sub-database, a foreign key association relationship exists between a plurality of partitioned tables of each sub-database. Therefore, operations such as cross-table join query can be effectively supported, thereby greatly improving the performance of the database.

It should be noted that operations for a delete statement, a modify statement, and the like are similar to that for the query statement. Therefore, for specific implementation of the operations for the delete statement, the modify statement, and the like and beneficial effects of the operations, refer to Embodiment 3, and details are not described herein.

Embodiment 4

What is the same as Embodiment 2 and Embodiment 3 is that in this embodiment, descriptions are provided still by using an example in which the data processing apparatus is specifically integrated in a proxy server, and the relational database is specifically MySQL. What is different from Embodiment 2 and Embodiment 3 is that in this embodiment, descriptions are provided by using an example in which the data processing request is specifically a join query (join) statement for the MySQL.

Figure 4A:
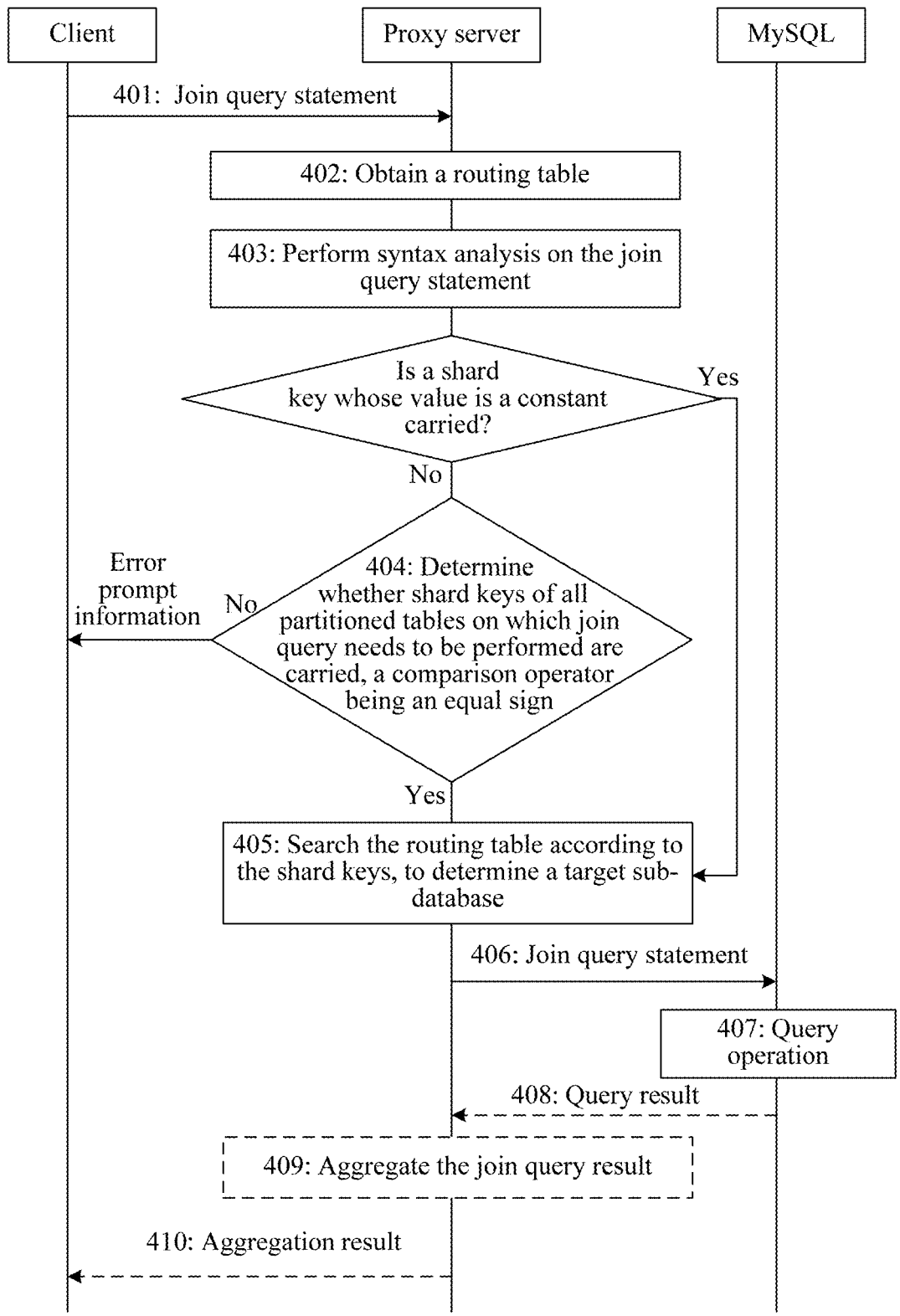
FIG. 4A is a flowchart of a join query operation in a data processing method according to an embodiment of the present disclosure.

As shown in FIG. 4A, a specific procedure of a data processing method based on the relational database may be as follows:

401: A client sends the join query statement for the MySQL to the proxy server.

The join query statement indicates a name of a partitioned table on which join query needs to be performed. In addition, the join query statement may further carry a shard key.

402: After receiving the join query statement, the proxy server obtains a routing table according to the join query statement.

The routing table stores structure information of the MySQL. The MySQL may include a plurality of sub-databases, a sub-database may include a plurality of partitioned tables, a foreign key association relationship exists between the plurality of partitioned tables, and each partitioned table may include a plurality of shards. For structures of the routing table and the My SQL, refer to Embodiment 2 and Embodiment 3, and details are not described herein again.

Figure 4B:
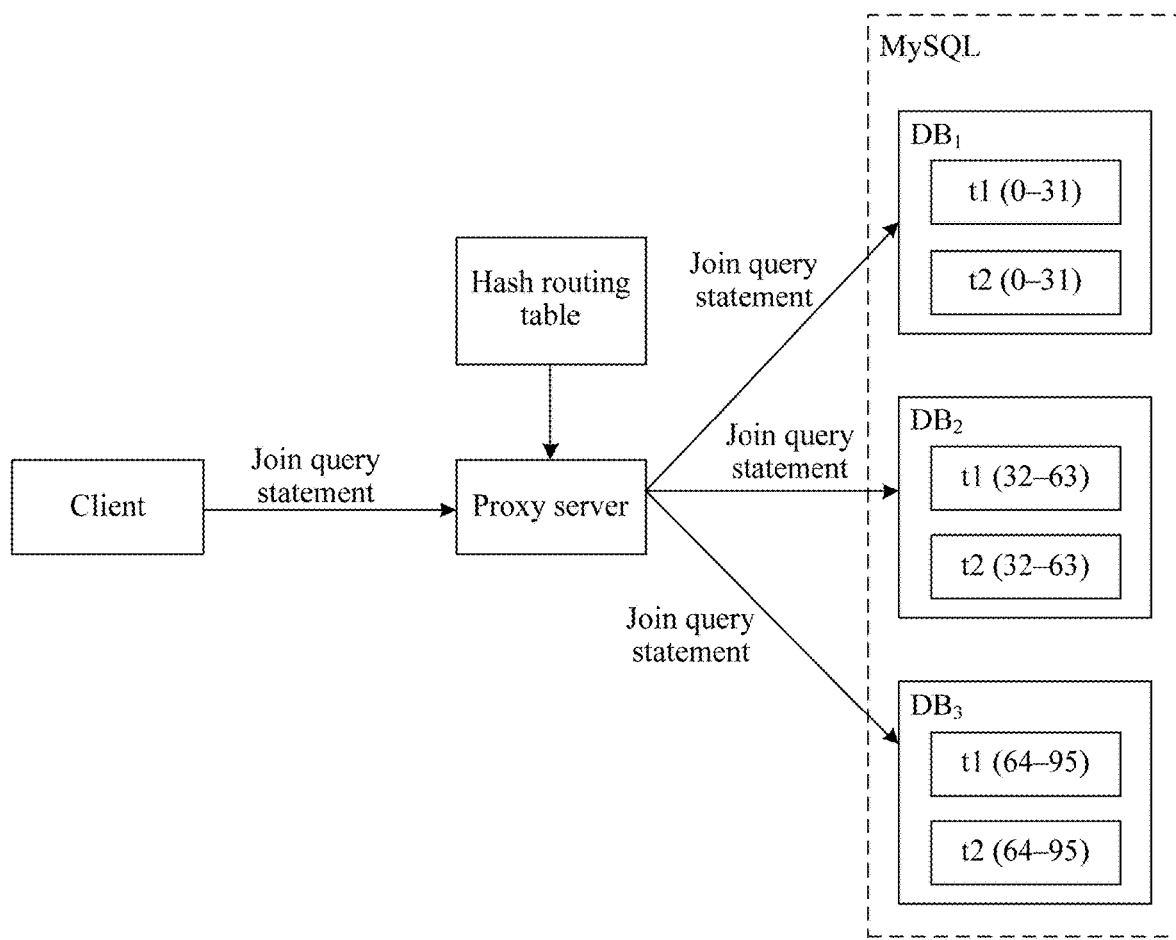
FIG. 4B is a schematic application scenario diagram of join query in a method according to an embodiment of the present disclosure.

The MySQL can be pre-established by maintenance personnel, or can be established by a system. For example, referring to FIG. 4B, the MySQL includes three sub-databases: $DB_1$, $DB_2$, and $DB_3$. For details, refer to Embodiment 2, and details are not described herein again.

403: The proxy server performs syntax analysis on the join query statement, to determine whether the join query statement carries a shard key whose value is a constant; and when the join query statement carries a shard key whose value is a constant, performs step 405; when the join query statement does not carry a shard key whose value is a constant, performs step 404.

For example, if the join query statement is:

MySQL>select $t1·b1$ from$t1$ inner join $t2$ on
    $t1·a1=t2·a2$ because the join query statement does not carry the shard key whose value is a constant, in this case, step 404 may be performed.

404: The proxy server determines whether the join query statement carries shard keys of all partitioned tables on which join query needs to be performed, a comparison operator between the shard keys being an equal sign; and when the join query statement carries shard keys of all partitioned tables, performs step 405; when the join query statement does not carry shard keys of all partitioned tables, rejects the join query statement. For example, error prompt information may be sent to the client.

For example, still, if the join query statement is:

MySQL>select $t1·b1$ from $t1$ inner join $t2$ on
    $t1·a1=t2·a2$

Because the join query statement carries the shard keys of all the partitioned tables on which join query needs to be performed, and the comparison operator between the shard keys is the equal sign, that is, $t1·a1=t2·a2$, in this case, step 405 can be performed.

It should be noted that determining in step 403 may be first performed and determining in step 404 may be then performed. Alternatively, determining in step 404 may be first performed and determining in step 403 may be then performed. That is, it is first determined whether the join query statement carries the shard keys of all the partitioned tables on which join query needs to be performed, the comparison operator between the shard keys being an equal sign. When the join query statement carries the shard keys of all the partitioned tables, step 405 is performed. When the join query statement does not carry the shard keys of all the partitioned tables, it is determined whether the join query statement carries a shard key whose value is a constant. If the join query statement carries the shard key whose value is a constant, step 405 is performed. Otherwise, when the join query statement does not carry the shard key whose value is a constant, the join query statement is rejected.

405: The proxy server searches the routing table according to the shard key carried in the join query statement, to determine a target sub-database.

For example, still in the example in step 404, the join query statement indicates that partitioned tables on which join query needs to be performed are t1 and t2, and it can be learned according to the routing table that both t1 and t2 exist in all of the sub-databases $DB_1$, $DB_2$, and $DB_3$. Therefore, in this case, it can be determined that target sub-databases are $DB_1$, $DB_2$, and $DB_3$.

406: The proxy server sends the join query statement to the target sub-database, and performs step 407.

For example, if the target sub-databases are determined as $DB_1$, $DB_2$, and $DB_3$ in step 405, the proxy server may send the join query statement to $DB_1$, $DB_2$, and $DB_3$.

407: The target sub-database performs a join query operation according to the join query statement.

For example, a join query operation can be performed on t1 and t2.

Optionally, after the insertion operation is performed, the target sub-database may further return a corresponding execution result to the proxy server. That is, the solution may further include step 408 to step 410.

408: The target sub-database returns a join query result to the proxy server.

409: After receiving the join query result, the proxy server aggregates the join query result, to obtain an aggregation result.

410: The proxy server sends the aggregation result to the client.

It can be learned from the foregoing that in this embodiment, after the join query (join) statement sent by the client is received, the routing table can be obtained according to the join query statement. Then, the target sub-database is determined according to the shard key carried in the join query statement and the routing table, and the join query statement is sent to the target sub-database, so that the target sub-database performs the join query operation according to the join query statement. Because in this embodiment of the present disclosure, the client does not need to search for routing between the sub-database and the partitioned table, a user does not need to learn of logic between each sub-database and each partitioned table. That is, from the perspective of the user, there is just MySQL. Therefore, compared with a solution in a common technology in which a particular application program is required to manage a sub-database, a partitioned table, and a routing rule for the sub-database and the partitioned table, routing in this embodiment of the present disclosure only needs to be simply disposed at a proxy layer, and implementation is relatively simple. In addition, in this embodiment of the present disclosure, when the table is being created, because the partitioned tables having the same shard key are grouped into one sub-database, a foreign key association relationship exists between a plurality of partitioned tables of each sub-database. Therefore, operations such as cross-table join query can be effectively supported, thereby greatly improving the performance of the database.

Embodiment 5

Optionally, based on Embodiments 2, 3, and 4, a data processing method provided in this embodiment of the present disclosure may further support a single back transaction operation. For example, when a transaction starts, each data processing request such as an insert statement or a query statement can be analyzed. If a relational database corresponding to one data processing request is different from that corresponding to a previous data processing request, the data processing request is rejected. That is, before the routing table is obtained according to the data processing request (such as an insert statement, a query statement, a delete statement, a modify statement, or a join query statement), the data processing method may further include:

determining, by the proxy server, whether the My SQL corresponding to the data processing request is consistent with MySQL corresponding to a previous data processing request; and if they are consistent, performing the step of obtaining a routing table according to the data processing request; or otherwise, if they are inconsistent, rejecting the data processing request, for example, rejecting the insertion request, the query request, the deletion request, the modification request, the join query request, or the like.

Optionally, when the data processing request is rejected, an error may be further reported. For example, error prompt information is generated and sent to the client.

Optionally, before it is determined whether the MySQL corresponding to the data processing request is consistent with MySQL corresponding to a previous data processing request, whether the query statement is a transaction termination statement may be further determined; and if the query statement is a transaction termination statement, the current transaction is terminated; or otherwise, if the query statement is not a transaction termination statement, the step of determining whether the MySQL corresponding to the data processing request is consistent with MySQL corresponding to a previous data processing request is performed.

It can be learned that in addition to beneficial effects that can be achieved in Embodiments 2 to 4, this embodiment can further support the single back transaction operation, which helps improve the flexibility and the processing efficiency.

Embodiment 6

Figure 5A:
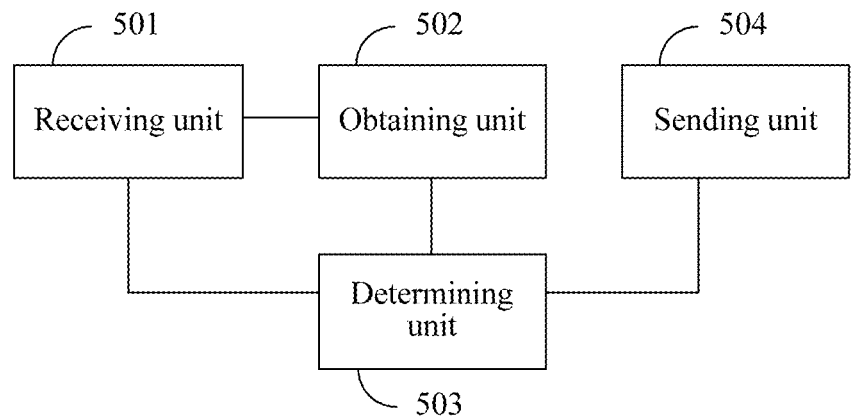
FIG. 5A is a schematic diagram of a data processing apparatus according to an embodiment of the present disclosure.

To better implement the foregoing method, this embodiment of the present disclosure further provides a data processing apparatus based on a relational database, which is referred to as a data processing apparatus for short. As shown in FIG. 5A, the data processing apparatus includes one or more memories; and one or more processors.

The one or more memories store one or more instruction modules, configured to be executed by the one or more processors.

The one or more instruction modules include a receiving unit 501, an obtaining unit 502, a determining unit 503, and a sending unit 504.

(1) Receiving Unit 501

The receiving unit 501 is configured to receive a data processing request sent by a client, the data processing request includes a shard key.

Similar to Embodiment 1, the data processing request may alternatively carry no shard key.

The data processing request may include a plurality of SQL statements, which, for example, may be specifically an insert statement, a query statement, a delete statement, a modify statement, or a join query statement for a relational database.

A type of the shard key carried in the data processing request may be specified according to an actual application requirement, and may be a character string or a specific value. When the routing table is to be searched, specifically, a hash operation can be performed on the shard key and then a modulo operation is performed. Then, the routing table is searched according to an obtained operation result, and details are not described herein.

(2) Obtaining Unit 502

The obtaining unit 502 is configured to obtain a routing table according to the data processing request, the routing table storing structure information of a relational database, the relational database including a plurality of sub-databases, the sub-database including a plurality of partitioned tables, a foreign key association relationship existing between the plurality of partitioned tables, and a partitioned table including a plurality of shards.

Similar to Embodiment 1, no foreign key association relationship may exist between the plurality of partitioned tables.

Figure 5B:
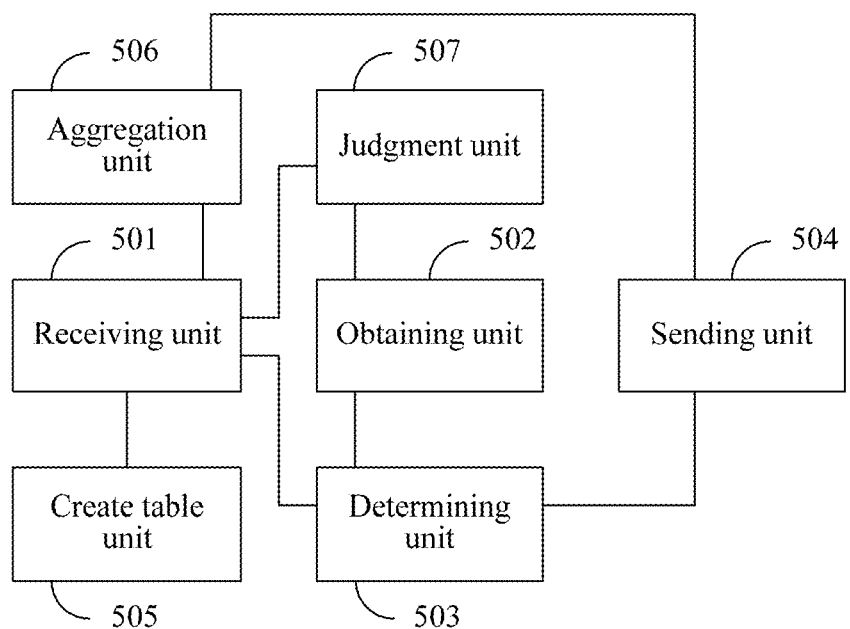
FIG. 5B is another schematic diagram of a data processing apparatus according to an embodiment of the present disclosure.

The relational database can be pre-established by maintenance personnel, or can be established by a system. That is, as shown in FIG. 5B, the data processing apparatus may further include a create table unit 505.

The receiving unit 501 may be further configured to receive a create table statement for the relational database and sent by the client, the create table statement indicating a name of a partitioned table needing to be created.

The create table unit 505 is configured to: perform syntax analysis on the create table statement, to determine whether the create table statement specifies a key name of a shard key; and when the create table statement specifies a key name of a shard key, establish an association relationship between the name of the partitioned table and the key name, record the association relationship into the routing table, and send the create table statement to the relational database, to perform a create table operation; and when the create table statement specifies no key name of a shard key, reject the create table statement.

For convenience of subsequent establishment of the foreign key association relationship between the partitioned tables, create table statements having a same shard key can be grouped into one sub-database.

The create table unit 505 may be specifically configured to: when determining that the create table statement specifies a key name of a shard key, determine whether another partitioned table in which the key name is used as a shard key exists in the routing table; and when the another partitioned table exists, send the create table statement to a sub-database to which the another partitioned table belongs, to perform the create table operation; and when the another partitioned table does not exist, send the create table statement to all sub-databases in the relational database, to perform the create table operation.

In this way, after table creation, subsequently, a foreign key association relationship between partitioned tables can be further established according to the shard key.

The create table unit 505 may be further configured to set a foreign key association relationship between a created partitioned table and another partitioned table according to the key name.

(3) Determining Unit 503

The determining unit 503 is configured to determine a target sub-database according to the shard key and the routing table.

In practice, there is also a case in which the data processing request does not carry a shard key. In this case, the target sub-database can also be determined. Therefore, functions of the determining unit 503 may also be described as "determining a target sub-database according to the data processing request and the routing table".

(4) Sending Unit 504

The sending unit 504 is configured to send the data processing request to the target sub-database, so that the target sub-database performs processing according to the data processing request.

According to different data processing requests, there are different manners of determining the target sub-database by the determining unit 503. For example, for insertion, query, deletion, modification, and join query (join), manners may be as follows:

(A) Insertion

When the data processing request is an insert statement for the relational database, the determining unit 503 may be specifically configured to:

perform syntax analysis on the insert statement, to determine whether a shard key recorded in the routing table exists in the insert statement; and when the shard key exists, search the routing table according to the shard key carried in the insert statement, to determine the target sub-database; and when the shard key does not exist, reject the insert statement.

(B) Query, Deletion, or Modification

When the data processing request is a query statement, a delete statement, or a modify statement for the relational database, the determining unit 503 may be specifically configured to:

perform syntax analysis on the query statement, the delete statement, or the modify statement, to determine whether a shard key recorded in the routing table exists in the query statement, the delete statement, or the modify statement; when the shard key exists, search the routing table according to the shard key carried in the query statement, the delete statement, or the modify statement, to determine the target sub-database; and when the shard key does not exist, determine all the sub-databases in the relational database as target sub-databases.

(C) Join Query

When the data processing request is a join query statement for the relational database, the join query statement indicating a name of a partitioned table on which join query needs to be performed, the determining unit 503 may be specifically configured to:

perform syntax analysis on the join query statement, to determine whether the join query statement satisfies a first condition or a second condition; when the first condition or the second condition is satisfied, search the routing table according to a shard key carried in the join query statement, to determine the target sub-database; and when neither the first condition nor the second condition is satisfied, reject the join query statement.

The first condition is that the join query statement carries a shard key whose value is a constant, the second condition is that the join query statement carries shard keys of all partitioned tables on which join query needs to be performed, and a comparison operator between the hard keys is an equal sign.

Optionally, when join query is performed, in addition to directly providing a join query result to the client, the data processing apparatus may also aggregate a join query result and then provide an aggregation result to the client. That is, as shown in FIG. 5B, the data processing apparatus may further include an aggregation unit 506.

The receiving unit 501 may be further configured to receive a join query result returned by the target sub-database.

The aggregation unit 506 may be configured to aggregate the join query result, to obtain an aggregation result.

The sending unit 504 may be further configured to send the aggregation result to the client.

In addition, optionally, the solution may further support a single back transaction. For example, when a transaction starts, each data processing request may be analyzed. When a relational database corresponding to one data processing request is different from that corresponding to a previous data processing request, the data processing request is rejected. That is, as shown in FIG. 5B, the data processing apparatus may further include a judgment unit 507.

The judgment unit 507 may be configured to: determine whether the relational database corresponding to the data processing request is consistent with a relational database corresponding to a previous data processing request; when the two relational databases are consistent, trigger the obtaining unit 502 to perform the operation of obtaining a routing table according to the data processing request; and when the two relational databases are inconsistent, reject the data processing request.

Optionally, when the data processing request is rejected, the judgment unit 507 may further report an error, for example, generating error prompt information, and the sending unit 504 sends the error prompt information to the client.

Optionally, before determining whether the relational database corresponding to the data processing request is consistent with a relational database corresponding to a previous data processing request, the judgment unit 507 may further determine whether the data processing request is a transaction termination statement; when the data processing request is a transaction termination statement, terminates the current transaction; and when the data processing request is not a transaction termination statement, performs the operation of determining whether the relational database corresponding to the data processing request is consistent with a relational database corresponding to a previous data processing request.

During specific implementation, the foregoing units may be implemented as independent entities, or may be combined arbitrarily, or may be implemented as a same entity or several entities. For specific implementation of the foregoing units, refer to the foregoing method embodiments. Details are not described herein again.

The data processing apparatus may be specifically integrated in a network side device, for example, a device such as a gateway or a proxy server.

It can be learned from the foregoing that, in this embodiment, after the data processing request sent by the client is received, the obtaining unit 502 can obtain the routing table according to the data processing request, the routing table storing the structure information of the relational database (the relational database including a plurality of sub-databases, the sub-database including a plurality of partitioned tables, the foreign key association relationship existing between the plurality of partitioned tables, and the partitioned table including a plurality of shards). Then, the determining unit 503 determines the target sub-database according to the shard key carried in the data processing request and the routing table, and the sending unit 504 sends the data processing request to the target sub-database, so that the target sub-database performs processing according to the data processing request. Because in this embodiment of the present disclosure, the client does not need to search for routing between the sub-database and the partitioned table, a user does not need to learn of logic between each sub-database and each partitioned table. That is, from the perspective of the user, there is just a relational database. Therefore, compared with a solution in a common technology in which a particular application program is required to manage a sub-database, a partitioned table, and a routing rule for the sub-database and the partitioned table, routing in this embodiment of the present disclosure only needs to be simply disposed at a proxy layer, and implementation is relatively simple. In addition, in this embodiment of the present disclosure, a foreign key association relationship exists between a plurality of partitioned tables of each sub-database. Therefore, operations such as cross-table join query (join) can be effectively supported, thereby greatly improving the performance of the database.

Embodiment 7

Correspondingly, this embodiment of the present disclosure further provides a data processing system, including any data processing apparatus (that is, the data processing apparatus based on the relational database) provided in the embodiments of the present disclosure. For details, refer to Embodiment 6. The data processing apparatus may be specifically integrated in a network side device, for example, a device such as a gateway or a proxy server. For example, the data processing apparatus is specifically integrated in a proxy server.

The proxy server is configured to: receive a data processing request sent by a client, the data processing request carrying a shard key; obtain a routing table according to the data processing request, the routing table storing structure information of a relational database, the relational database including a plurality of sub-databases, the sub-database including a plurality of partitioned tables, a foreign key association relationship existing between the plurality of partitioned tables, and the partitioned table including a plurality of shards; determine a target sub-database according to the shard key and the routing table; and send the data processing request to the target sub-database, so that the target sub-database performs an operation according to the data processing request.

The data processing request may include a plurality of SQL statements, which, for example, may be specifically an insert statement, a query statement, a delete statement, a modify statement, or a join query statement for a relational database.

The proxy server may be further configured to create the routing table. For details, refer to the foregoing embodiments, and details are not described herein again.

Optionally, the data processing system may further include other devices, such as a client and a relational database. For example, details may be as follows:

The client is configured to send the data processing request to the proxy server.

The relational database is configured to: receive the data processing request sent by the proxy server, and perform processing according to the data processing request, for example, when the data processing request is an insert statement, performing an insertion operation; when the data processing request is a query statement, performing a query operation; and if the data processing request is a join query (join) statement, performing a join query operation.

The relational database may be further configured to return a corresponding data processing result to the proxy server.

In this case, the proxy server may be further configured to receive the data processing result sent by the relational database, and send the data processing result to the client.

The client may be further configured to receive the data processing result returned by the proxy server, for example, an insertion result or a query result.

For specific implementation of each of the foregoing devices, refer to the foregoing embodiments, and details are not described herein again.

The data processing system can include any data processing apparatus provided in the embodiments of the present disclosure. Therefore, the data processing system can achieve the beneficial effects that can be achieved by any data processing apparatus provided in the embodiments of the present disclosure. For details, refer to the foregoing embodiments, and details are not described herein again.

Embodiment 8

Figure 6:
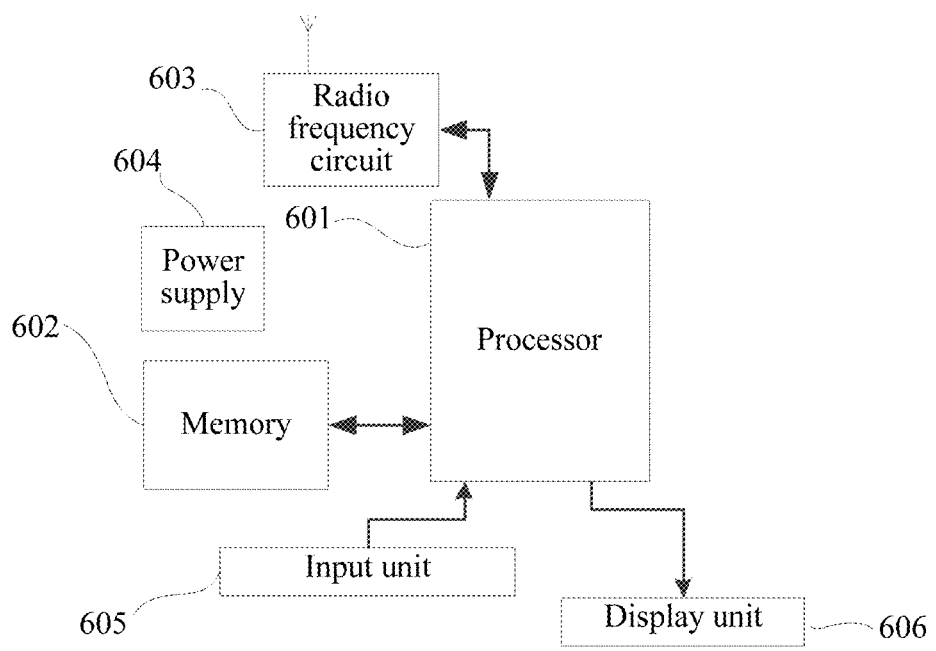
FIG. 6 is a schematic diagram of a proxy server according to an embodiment of the present disclosure.

This embodiment of the present disclosure further provides a server, which may be specifically a proxy server. As shown in FIG. 6, FIG. 6 is a schematic structural diagram of the server in this embodiment of the present disclosure. Details are as follows:

The server may include components such as a processor 601 including one or more processing cores, a memory 602 including one or more computer-readable storage media, a radio frequency (RF) circuit 603, a power supply 604, an input unit 605, and a display unit 606. A person skilled in the art may understand that the server structure shown in FIG. 6 does not constitute a limit to the server. The server may include more or fewer parts than those shown in the figure, may combine some parts, or may have different part arrangements.

The processor 601 is a control center of the server, and is connected to various parts of the entire server by using various interfaces and lines. By running or executing a software program and/or module stored in the memory 602, and invoking data stored in the memory 602, the processor 601 executes various functions of the server and performs data processing, thereby monitoring the entire server. Optionally, the processor 601 may include one or more processor cores. Preferably, the processor 601 may integrate an application processor and a modem processor. The application processor mainly processes an operating system, a user interface, an application program, and the like. The modem processor mainly processes wireless communication. It may be understood that the foregoing modem processor may alternatively not be integrated into the processor 601.

The memory 602 may be configured to store a software program and module. The processor 601 runs the software program and module stored in the memory 602, to implement various functional applications and data processing. The memory 602 may mainly include a program storage area and a data storage area. The program storage area may store an operating system, an application program required by at least one function (such as a sound playing function and an image display function), and the like. The data storage area may store data created according to use of the server, and the like. In addition, the memory 602 may include a high speed random access memory, and may further include a non-volatile memory, such as at least one magnetic disk storage device, a flash memory, or other volatile solid-state storage devices. Correspondingly, the memory 602 may further include a memory controller, to provide access of the processor 601 to the memory 602.

The RF circuit 603 may be configured to receive and send a signal during information transmission and receiving. Especially, the RF circuit 603 sends, after receiving downlink information of a base station, the information to one or more processors 601 for processing, and sends involved uplink data to the base station. Generally, the RF circuit 603 includes but is not limited to an antenna, at least one amplifier, a tuner, one or more oscillators, a subscriber identity module (SIM) card, a transceiver, a coupler, a low noise amplifier (LNA), a duplexer, and the like. In addition, the RF circuit 603 may also communicate with a network and another device by wireless communication. The wireless communication may use any communication standard or protocol, which includes but is not limited to, Global System for Mobile Communications (GSM), General Packet Radio Service (GPRS), Code Division Multiple Access (CDMA), Wideband Code Division Multiple Access (WCDMA), Long Term Evolution (LTE), e-mail, Short Message Service (SMS), and the like.

The server further includes the power supply 604 (for example, a battery) that supplies power to each component. Preferably, the power supply 604 may be logically connected to the processor 601 by using a power supply management system, so that functions such as management of charging, discharging, and power consumption are implemented by using the power supply management system. The power supply 604 may further include one or more of a direct current or alternating current power supply, a recharging system, a power failure detection circuit, a power supply converter or inverter, a power supply state indicator, and any other components.

The server may further include the input unit 605. The input unit 605 may be configured to receive entered numeric or character information and generate keyboard, mouse, joystick, optical, or trackball signal input related to user settings and function control. Specifically, in a specific embodiment, the input unit 605 may include a touch-sensitive surface and another input device. The touch-sensitive surface, which may also be referred to as a touch screen or a touch panel, may collect a touch operation of a user on or near the touch-sensitive surface (such as an operation of a user on or near the touch-sensitive surface by using any suitable object or accessory such as a finger or a stylus), and drive a corresponding connection apparatus according to a preset program. Optionally, the touch-sensitive surface may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 601. Moreover, the touch controller can receive and execute a command sent by the processor 601. In addition, the touch-sensitive surface may be implemented in multiple types, such as a resistive type, a capacitive type, an infrared type, and a surface acoustic wave type. In addition to the touch-sensitive surface, the input unit 605 may further include another input device. Specifically, the another input device may include but is not limited to one or more of a physical keyboard, a function key (for example, a volume control key or a power on/off key), a trackball, a mouse, or a joystick.

The server may further include the display unit 606. The display unit 606 may be configured to display information entered by the user or information provided to the user, and graphical user interfaces of the server. The graphical user interfaces each may include an image, text, an icon, a video, or any combination thereof. The display unit 606 may include a display panel. Optionally, the display panel may be configured in a form of a liquid crystal display (LCD), an organic light-emitting diode (OLED), or the like. Further, the touch-sensitive surface may cover the display panel. After detecting a touch operation on or near the touch-sensitive surface, the touch-sensitive surface transfer the touch operation to the processor 601 to determine a type of a touch event, and then the processor 601 provides corresponding visual output on the display panel according to the type of the touch event. Although in FIG. 6, the touch-sensitive surface and the display panel are used as two separate parts to implement input and output functions, in some embodiments, the touch-sensitive surface and the display panel may be integrated to implement the input and output functions.

Although not shown, the server may further include a camera, a Bluetooth module, and the like. Details are not described herein. Specifically, in this embodiment, the processor 601 of the server may load, according to the following instructions, executable files corresponding to processes of one or more application programs into the memory 602. The processor 601 runs the application programs stored in the memory 602, to implement various functions:

receiving a data processing request sent by a client, the data processing request carrying a shard key; obtaining a routing table according to the data processing request, the routing table storing structure information of a relational database, the relational database including a plurality of sub-databases, the sub-database including a plurality of partitioned tables, a foreign key association relationship existing between the plurality of partitioned tables, and the partitioned table including a plurality of shards; determining a target sub-database according to the shard key and the routing table; and sending the data processing request to the target sub-database, so that the target sub-database performs an operation according to the data processing request.

The data processing request may include a plurality of SQL statements, which, for example, may be specifically an insert statement, a query statement, a delete statement, a modify statement, or a join query statement for a relational database.

The relational database can be pre-established by maintenance personnel, or can be established by a system. That is, the processor 601 can further implement the following functions:

receiving a create table statement for the relational database and sent by the client, the create table statement indicating a name of a partitioned table needing to be created; performing syntax analysis on the create table statement, to determine whether the create table statement specifies a key name of a shard key; when the create table statement specifies a key name of a shard key, establishing an association relationship between the name of the partitioned table and the key name, recording the association relationship into the routing table, and sending the create table statement to the relational database, to perform a create table operation; and when the create table statement specifies no key name of a shard key, rejecting the create table statement.

In addition, optionally, the solution may further support a single back transaction. That is, the processor 601 can further implement the following functions:

determining whether the relational database corresponding to the data processing request is consistent with a relational database corresponding to a previous data processing request; when the two relational databases are consistent, performing the step of obtaining a routing table according to the data processing request; and when the two relational databases are inconsistent, rejecting the data processing request.

For specific implementation of the above operations, refer to the foregoing embodiments, and details are not described herein again.

It can be learned from the foregoing that, in this embodiment, after receiving the data processing request sent by the client, the server can obtain the routing table according to the data processing request, the routing table storing the structure information of the relational database (the relational database including a plurality of sub-databases, the sub-database including a plurality of partitioned tables, the foreign key association relationship existing between the plurality of partitioned tables, and the partitioned table including a plurality of shards), then, determine the target sub-database according to the shard key carried in the data processing request and the routing table, and send the data processing request to the target sub-database, so that the target sub-database performs an operation according to the data processing request. Because in the embodiment of the present disclosure, the client does not need to search for routing between the sub-database and the partitioned table, a user does not need to learn of logic between each sub-database and each partitioned table. That is, from the perspective of the user, there is just a relational database. Therefore, compared with a solution in a common technology in which a particular application program is required to manage a sub-database, a partitioned table, and a routing rule for the sub-database and the partitioned table, routing in the embodiment of the present disclosure only needs to be simply disposed at a proxy layer, and implementation is relatively simple. In addition, in the embodiment of the present disclosure, a foreign key association relationship exists between a plurality of partitioned tables of each sub-database. Therefore, operations such as cross-table join query (join) can be effectively supported, thereby greatly improving the performance of the database.

An embodiment of the present disclosure further provides a non-volatile computer-readable storage medium, storing computer-readable instructions, to enable at least one processor to perform any operation of the foregoing method, for example:

receiving a data processing request sent by a client;

obtaining a routing table according to the data processing request, the routing table storing structure information of a relational database, the relational database including a plurality of sub-databases, the sub-database including a plurality of partitioned tables, and the partitioned table including a plurality of shards determining a target sub-database according to the data processing request and the routing table; and sending the data processing request to the target sub-database, so that the target sub-database performs an operation according to the data processing request.

A person of ordinary skill in the art may understand that all or some of the steps of the methods in the foregoing embodiments may be implemented by a program instructing relevant hardware. The program may be stored in a computer-readable storage medium. The storage medium may include a read-only memory (ROM), a random access memory (RAM), a magnetic disk, an optical disc, or the like.

The data processing method, apparatus and system based on a relational database provided in the embodiments of the present disclosure are described above in detail. This specification explains the principles and implementations of the present disclosure by using specific examples. The descriptions of the foregoing embodiments are merely intended to help understand the method of the present disclosure and the core idea of the present disclosure. In addition, a person skilled in the art may make some variations in specific implementations and application scopes according to the idea of the present disclosure. Therefore, this specification shall not be understood as a limitation to the present disclosure.

What is claimed is:

1. A method, comprising:
receiving, by a device comprising a memory and a processor in communication with the memory, a data processing request sent by a client;
obtaining, by the device, a routing table according to the data processing request, wherein:
the routing table comprises structure information of a relational database,
the relational database comprises a plurality of sub-databases,
a sub-database of the plurality of sub-databases comprises a plurality of partitioned tables, and
a partitioned table of the plurality of partitioned tables comprises a plurality of shards;
determining, by the device, a target sub-database of the plurality of sub-databases according to the data processing request and the routing table;
sending, by the device, the data processing request to the target sub-database, so that the target sub-database performs an operation according to the data processing request; and
before the receiving the data processing request sent by the client:
receiving, by the device, a create table statement for the relational database sent by the client, the create table statement comprising a name of a partitioned table needing to be created;
performing, by the device, syntax analysis on the create table statement, to determine whether the create table statement comprises a key name of a shard key;
after the determining that a create table statement comprises the key name of the shard key:
establishing, by the device, an association relationship between the name of the partitioned table and the key name,
recording, by the device, the association relationship into the routing table, and
sending, by the device, the create table statement to the relational database, to perform a create table operation; and
after the determining that a key name of a shard key is not provided in a create table statement, rejecting, by the device, the create table statement.

2. The method according to claim 1, wherein a foreign key association relationship exists between the plurality of partitioned tables.

3. The method according to claim 1, wherein, after the determining that the create table statement comprises the key name of the shard key, the sending the create table statement to the relational database, to perform a create table operation comprises:
determining, by the device, whether another partitioned table in which the key name is used for a shard key exists in the routing table;
when the device determines that the another partitioned table exists, sending, by the device, the create table statement to a sub-database to which the another partitioned table belongs, to perform the create table operation; and
when the device determines that the another partitioned table does not exist, sending, by the device, the create table statement to all sub-databases in the relational database, to perform the create table operation.

4. The method according to claim 3, after the create table operation is performed, the method further comprising:
setting, by the device, a foreign key association relationship between a created partitioned table and the another partitioned table according to the key name.

5. The method according to claim 1, wherein:
the data processing request comprises an insert statement for the relational database; and
the determining the target sub-database according to the data processing request and the routing table comprises:
performing, by the device, syntax analysis on the insert statement, to determine whether a shard key recorded in the routing table exists in the insert statement,
when the device determines that the shard key recorded in the routing table exists in the insert statement, searching, by the device, the routing table according to the shard key recorded in the routing table, to determine the target sub-database, and
when the device determines that the shard key recorded in the routing table does not exist in the insert statement, rejecting, by the device, the insert statement.

6. The method according to claim 1, wherein:
the data processing request comprises an operational statement, wherein the operational statement comprises at least one of a query statement, a delete statement, or a modify statement for the relational database; and
the determining the target sub-database according to the data processing request and the routing table comprises:
performing, by the device, syntax analysis on the operational statement to determine whether a shard key recorded in the routing table exists in the operational statement,
when the device determines that the shard key recorded in the routing table exists in the operational statement, searching, by the device, the routing table according to the shard key to determine the target sub-database, and
when the device determines that the shard key recorded in the routing table does not exist in the operational statement, determining, by the device, all sub-databases in the relational database as target sub-databases.

7. The method according to claim 1, before the obtaining a routing table according to the data processing request, the method further comprising:
determining, by the device, whether the relational database corresponding to the data processing request is consistent with a previous relational database corresponding to a previous data processing request;
when the device determines that the relational database is consistent with the previous relational database, performing, by the device, the step of obtaining a routing table according to the data processing request; and
when the device determines that the relational database is not consistent with the previous relational database, rejecting, by the device, the data processing request.

8. A method, comprising:
receiving, by a device comprising a memory and a processor in communication with the memory, a data processing request sent by a client;
obtaining, by the device, a routing table according to the data processing request, wherein:
the routing table comprises structure information of a relational database,
the relational database comprises a plurality of sub-databases, a sub-database of the plurality of sub-databases comprises a plurality of partitioned tables, and
a partitioned table of the plurality of partitioned tables comprises a plurality of shards;
determining, by the device, a target sub-database of the plurality of sub-databases according to the data processing request and the routing table; and
sending, by the device, the data processing request to the target sub-database, so that the target sub-database performs an operation according to the data processing request,
wherein:
the data processing request comprises a join query statement for the relational database; and
the determining the target sub-database according to the data processing request and the routing table comprises:
performing, by the device, syntax analysis on the join query statement, to determine whether the join query statement satisfies a first condition or a second condition, wherein:
when the join query statement carries a shard key whose value is a constant, the join query statement satisfies the first condition, and
when the join query statement carries shard keys of all partitioned tables on which join query needs to be performed, and a comparison operator between the shard keys being an equal sign, the join query statement satisfies the second condition,
when the device determines that the join query statement satisfies the first condition or the second condition, searching, by the device, the routing table according to the shard key carried in the join query statement, to determine the target sub-database, and
when the device determines that the join query statement does not satisfy the first condition or the second condition, rejecting, by the device, the join query statement.

9. The method according to claim 8, after the sending the data processing request to the target sub-database, the method further comprising:
receiving, by the device, a join query result returned by the target sub-database;
aggregating, by the device, the join query result, to obtain an aggregation result; and
sending, by the device, the aggregation result to the client.

10. An apparatus, comprising:
a memory storing instructions; and
a processor in communication with the memory, wherein, when the processor executes the instructions, the processor is configured to cause the apparatus to:
receive a data processing request sent by a client,
obtain a routing table according to the data processing request, wherein:
the routing table comprises structure information of a relational database,
the relational database comprises a plurality of sub-databases,
a sub-database of the plurality of sub-databases comprises a plurality of partitioned tables, and
a partitioned table of the plurality of partitioned tables comprises a plurality of shards,
determine a target sub-database of the plurality of sub-databases according to the data processing request and the routing table, and
send the data processing request to the target sub-database, so that the target sub-database performs an operation according to the data processing request,
wherein, before the processor is configured to cause the apparatus to receive the data processing request sent by the client, the processor is configured to cause the apparatus to:
receive a create table statement for the relational database sent by the client, the create table statement comprising a name of a partitioned table needing to be created;
perform syntax analysis on the create table statement, to determine whether the create table statement comprises a key name of a shard key;
when the apparatus determines that the create table statement comprises the key name of the shard key:
establish an association relationship between the name of the partitioned table and the key name,
record the association relationship into the routing table, and
send the create table statement to the relational database, to perform a create table operation; and
when the apparatus determines that a key name of a shard key is not provided in the create table statement, reject the create table statement.

11. The apparatus according to claim 10, wherein, when the processor is configured to cause the apparatus to send the create table statement to the relational database, to perform a create table operation, the processor is configured to cause the apparatus to:
determine whether another partitioned table in which the key name is used for a shard key exists in the routing table;
when the apparatus determines that the another partitioned table exists, send the create table statement to a sub-database to which the another partitioned table belongs, to perform the create table operation; and
when the apparatus determines that the another partitioned table does not exist, send the create table statement to all sub-databases in the relational database, to perform the create table operation.

12. The apparatus according to claim 11, wherein, when the processor executes the instructions, the processor is further configured to cause the apparatus to:
set a foreign key association relationship between a created partitioned table and the another partitioned table according to the key name.

13. The apparatus according to claim 10, wherein:
the data processing request comprises an insert statement for the relational database; and
when the processor is configured to cause the apparatus to determine the target sub-database according to the data processing request and the routing table, the processor is configured to cause the apparatus to:
perform syntax analysis on the insert statement, to determine whether a shard key recorded in the routing table exists in the insert statement,
when the apparatus determines that the shard key recorded in the routing table exists in the insert statement, search the routing table according to the shard key recorded in the routing table, to determine the target sub-database, and
when the apparatus determines that the shard key recorded in the routing table does not exist in the insert statement, reject the insert statement.

14. The apparatus according to claim 10, wherein:
the data processing request comprises an operational statement, wherein the operational statement comprises at least one of a query statement, a delete statement, or a modify statement for the relational database; and
when the processor is configured to cause the apparatus to determine the target sub-database according to the data processing request and the routing table, the processor is configured to cause the apparatus to:
perform syntax analysis on the operational statement to determine whether a shard key recorded in the routing table exists in the operational statement,
when the apparatus determines that the shard key recorded in the routing table exists in the operational statement, search the routing table according to the shard key to determine the target sub-database, and
when the apparatus determines that the shard key recorded in the routing table does not exist in the operational statement, determine all sub-databases in the relational database as target sub-databases.

15. The apparatus according to claim 10, wherein:
the data processing request comprises a join query statement for the relational database; and
when the processor is configured to cause the apparatus to determine the target sub-database according to the data processing request and the routing table, the processor is configured to cause the apparatus to:
perform syntax analysis on the join query statement, to determine whether the join query statement satisfies a first condition or a second condition, wherein:
when the join query statement carries a shard key whose value is a constant, the join query statement satisfies the first condition, and
when the join query statement carries shard keys of all partitioned tables on which join query needs to be performed, and a comparison operator between the shard keys being an equal sign, the join query statement satisfies the second condition,
when the apparatus determines that the join query statement satisfies the first condition or the second condition, search the routing table according to the shard key carried in the join query statement, to determine the target sub-database, and
when the apparatus determines that the join query statement does not satisfy the first condition or the second condition, reject the join query statement.

16. The apparatus according to claim 15, wherein, when the processor executes the instructions, the processor is further configured to cause the apparatus to:
receive a join query result returned by the target sub-database;
aggregate the join query result, to obtain an aggregation result; and
send the aggregation result to the client.

17. The apparatus according to claim 10, wherein, when the processor executes the instructions, the processor is further configured to cause the apparatus to:
determine whether the relational database corresponding to the data processing request is consistent with a previous relational database corresponding to a previous data processing request;
when the apparatus determines that the relational database is consistent with the previous relational database, perform the operation of obtaining a routing table according to the data processing request; and
when the apparatus determines that the relational database is not consistent with the previous relational database, reject the data processing request.

18. A non-transitory computer readable storage medium storing instructions, the instructions, when executed by a processor, cause the processor to perform:
receiving a data processing request sent by a client;
obtaining a routing table according to the data processing request, wherein:
the routing table comprises structure information of a relational database,
the relational database comprises a plurality of sub-databases,
a sub-database of the plurality of sub-databases comprises a plurality of partitioned tables, and
a partitioned table of the plurality of partitioned tables comprises a plurality of shards;
determining a target sub-database of the plurality of sub-databases according to the data processing request and the routing table;
sending the data processing request to the target sub-database, so that the target sub-database performs an operation according to the data processing request; and
before the receiving the data processing request sent by the client:
receiving a create table statement for the relational database sent by the client, the create table statement comprising a name of a partitioned table needing to be created;
performing syntax analysis on the create table statement, to determine whether the create table statement comprises a key name of a shard key;
in response to determining that the create table statement comprises the key name of the shard key:
establishing an association relationship between the name of the partitioned table and the key name,
recording the association relationship into the routing table, and
sending the create table statement to the relational database, to perform a create table operation; and
in response to determining that a key name of a shard key is not provided in the create table statement, rejecting the create table statement.

\* \* \* \* \*